(12) United States Patent
Morse

(10) Patent No.: US 10,893,772 B2
(45) Date of Patent: Jan. 19, 2021

(54) INFUSION EXTRACTING APPARATUS AND METHOD

(71) Applicant: Made Simpli, LLC, Claremont, CA (US)

(72) Inventor: Jennifer Morse, San Marcos, CA (US)

(73) Assignee: MADE SIMPLI, LLC, Claremont, CA (US)

( * ) Notice: Subject to any disclaimer, the term of this patent is extended or adjusted under 35 U.S.C. 154(b) by 642 days.

(21) Appl. No.: 15/636,570

(22) Filed: Jun. 28, 2017

(65) Prior Publication Data

US 2017/0360240 A1  Dec. 21, 2017

Related U.S. Application Data

(63) Continuation-in-part of application No. PCT/US2016/012771, filed on Jan. 9, 2016, which is a continuation-in-part of application No. 14/991,942, filed on Jan. 9, 2016, now Pat. No. 9,492,027, which is a continuation-in-part of application No. 14/593,643, filed on Jan. 9, 2015, now Pat. No. 9,526,369, application No. 15/636,570, which is a continuation-in-part of application No. 15/265,438, filed on Sep. 14, 2016, which is a continuation of
(Continued)

(51) Int. Cl.
*A47J 31/38* (2006.01)
*A47J 31/20* (2006.01)

(52) U.S. Cl.
CPC .............. *A47J 31/38* (2013.01); *A47J 31/20* (2013.01)

(58) Field of Classification Search
CPC . A47J 31/18; A47J 31/20; A47J 31/38; A47G 19/16
USPC .................... 99/379, 316–319, 297
See application file for complete search history.

(56) References Cited

U.S. PATENT DOCUMENTS

2003/0070979 A1* 4/2003 Huang .............. A47J 31/20
210/469
2006/0124628 A1* 6/2006 Long ................ A47J 31/20
219/438
(Continued)

FOREIGN PATENT DOCUMENTS

FR            936643 A  *  7/1948  ............. A47J 31/20
WO   WO-2012025125 A2 *  3/2012  ............. A47J 31/20

*Primary Examiner* — Ibrahime A Abraham
*Assistant Examiner* — John J Norton
(74) *Attorney, Agent, or Firm* — Hackler Daghighian Martino & Novak

(57) ABSTRACT

An extraction apparatus and methods for making and using the same are disclosed. The apparatus includes a cylindrical container with lid and pour spout, a container insert, and a plunger including a piston, a rod, a handle, and a filter or filtration chamber. The container insert is designed to catch infusible material which may be easily removed from the container when the container is empty or when the extract fluid remains in the container. The plunger may temporarily couple with the insert to allow the insert to be pulled up through the container with the grounds of other infusible material captured between the insert and the plunger allowing for quick and easy cleanup. The extraction apparatus is adapted for a use in a variety of sizes and may be adapted for manufactured at low cost. A variety of embodiments and alternatives are also included in the disclosure.

19 Claims, 20 Drawing Sheets

Related U.S. Application Data application No. 14/593,643, filed on Jan. 9, 2015, now Pat. No. 9,526,369.

(60) Provisional application No. 61/964,621, filed on Jan. 10, 2014.

(56) References Cited

U.S. PATENT DOCUMENTS

| | | | |
|---|---|---|---|
| 2011/0056385 A1* | 3/2011 | McLean | B01D 11/0253 99/297 |
| 2011/0146496 A1* | 6/2011 | Bodum | A47J 31/20 99/275 |
| 2014/0072684 A1* | 3/2014 | Madden | A47J 31/005 426/431 |

* cited by examiner

INFUSION EXTRACTING APPARATUS AND METHOD

CROSS-REFERENCE TO RELATED APPLICATIONS

The present application is a continuation-in-part of and claims the benefit of priority to PCT Patent Application No. PCT/US16/12771, filed Jan. 9, 2016, which is a continuation of U.S. patent application Ser. No. 14/991,942, filed Jan. 9, 2016, now U.S. Pat. No. 9,492,027, which is a continuation-in-part of U.S. patent application Ser. No. 14/593,643, filed Jan. 9, 2015, now U.S. Pat. No. 9,526,369, which claims benefit of and priority to U.S. Provisional Application No. 61/964,621 filed Jan. 10, 2014. In addition, the present application is a continuation-in-part of and claims the benefit of priority to U.S. patent application Ser. No. 15/265,438, filed Sep. 14, 2016, which is a continuation of U.S. patent application Ser. No. 14/593,643, filed Jan. 9, 2015, now U.S. Pat. No. 9,526,369, which claims the benefit of priority to U.S. Provisional Application No. 61/964,621 filed Jan. 10, 2014. The above applications are hereby incorporated by reference in their entirety and are to be considered a part of this specification.

FIELD

The present disclosure is related to a piston-type apparatus capable of use for extracting an infusible material from an extract (such as coffee or tea) and method for using the same.

BACKGROUND

Extraction devices, such as the French Press type coffee maker, have been in use for many years. Generally, they involve placing an infusible material (such as ground coffee beans or tea leaves) in a container filled with hot water and, after allowing the mixture to steep for a sufficient time period, the infusible material is pushed downward into the container using a plunger with strainer to separate the infusible material from the extract. The infusible material is trapped between the strainer and the bottom of the container, and the extract is poured out. Such devices and methods are not limited to use with coffee or tea. Some medical devices, for example, operate with a similar manner and technique.

The basic problems associated with prior art devices and methods is that they do not allow for easy cleanup of the infusible material once the extraction has taken place and/or they require that the extract be poured out of the container before the infusible material can be easily removed. For example, with a typical prior art French Press type coffee maker, the user must remove the plunger and strainer and then wash the spent grounds out of the container. This can be a messy process, particularly if there is not a handy water source. And, it can difficult to remove coffee grounds using water without have a significant portion wash down a drain or otherwise get all over the sink. If a user decides to leave the coffee grounds in the container, then she must remove the extract immediately or otherwise the extract will become bitter as some portion of the extract remains in contact with the coffee grounds until either the grounds or the extract is completely removed.

What is needed is a French Press type apparatus that allows for separation of the infusible material from the extract, easy cleanup and the ability to remove the infusible material without having to remove the extract.

SUMMARY

The present disclosure provides an improved extract separation apparatus adapted to address some of the shortcomings of French Press type extraction apparati known in the prior art.

In an exemplary embodiment of the present disclosure, an extract separation apparatus for separating an infused extract from a mixture of an infusible material and the extract is described.

The apparatus in the exemplary embodiment comprises an infusing container adapted for holding a mixture of extract and infusible material and having a bottom and one or more substantially vertical walls oriented substantially parallel to a vertical axis of the container. The container may have a removable lid, pouring spout, and handle.

The apparatus in the exemplary embodiment also comprises a container insert adapted to be inserted into the container and moved down the vertical axis of the container and be seated at or near the bottom of the container. The insert has a beveled (or sloping) rim adapted to allow infusing materials to slide down into the bottom of the insert and as well as allow infusing material to flow into the space defined between the insert and the container wall. The insert rim also has a peripheral sealing means adapted to prevent infusible material (i.e., grounds) from getting to into the space between the insert and the container wall while allowing easy insertion and extraction of the insert from the container. The insert and plunger have corresponding coupling means for temporarily coupling the insert to the plunger when the plunger is pushed down into the insert.

The apparatus in the exemplary embodiment also comprises a plunger comprising a rod connected with a handle at one end and with a filtration chamber at the other end. The filtration chamber comprises: a) an upper perforated surface with peripheral seal adapted to separate the extract from the infusible material when the chamber is pushed down into the container containing the mixture of extract and infusible material along the container vertical axis, b) a lower perforated surface similar to the upper perforated surface, and c) walls connecting the upper and lower perforated surfaces. The walls have a coupling means adapted to temporarily engage with the corresponding insert coupling means allowing the plunger to be coupled with the insert when the plunger has been pushed sufficiently down into the insert trapping the infusible material between the insert and the plunger and pulled up together leaving the extract in the container. In some embodiments, the interior of the filtration chamber is accessible to allow placement of one or more additional filter means (such as a paper filter) within it.

BRIEF DESCRIPTION OF THE DRAWINGS

In FIG. 11, the plunger is shown as pressed down through and coupled with the container insert.

The Figures are for purposes of illustrating several embodiments of the assembly and method consistent with the principles of the present disclosure and are not for purposes of limiting the same.

DETAILED DESCRIPTION OF THE PREFERRED EMBODIMENTS

Figure 1:
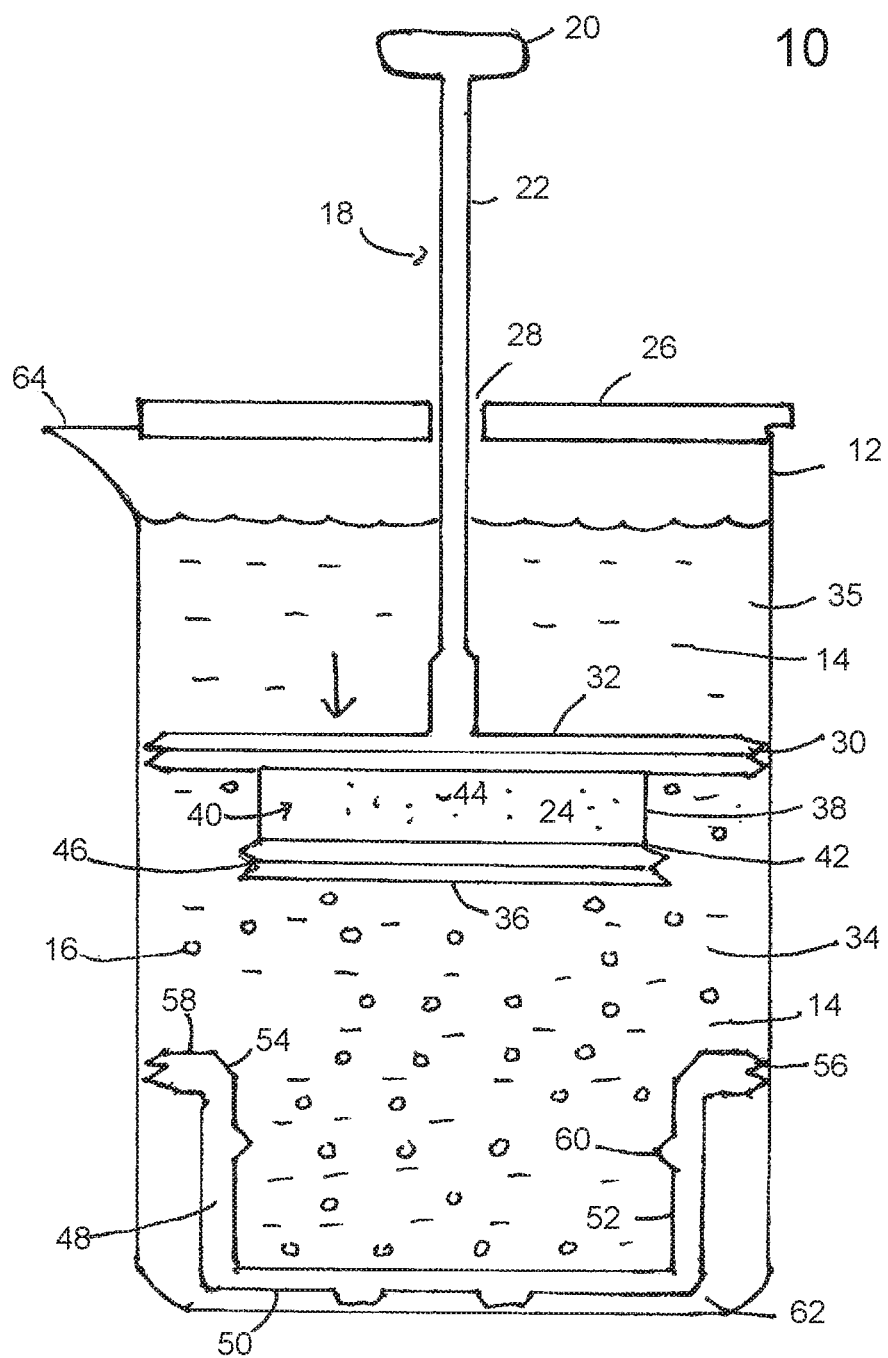
FIG. 1 depicts a vertical section of an exemplary embodiment consistent with the principles of the present disclosure showing a plunger in a starting position inside an infusing container having an insert and containing a mixture of infusible material and extract.

FIG. 1 is a vertical section view of an embodiment of the extraction apparatus which is configured similarly to a French Press type coffee or tea making apparatus. FIG. 1 shows the extraction apparatus 10 in a first or starting position for separating the extract 14 from the mixture of extract 14 and infusible material 16 in the infusing container 12.

The extraction apparatus 10 comprises an exemplary walled cylinder infusing container 12 containing a mixture of extract 14 and infusible material 16. The infusing container may be made of glass, metal, or other materials typically used with coffee/tea making apparati. The plunger 18 is adapted to fit within the infusing container 12 and be moved within the infusing container 12 along a central vertical axis thereof. The plunger may comprise a handle (or knob) 20 attached with a rod 22 attached with a filtration basket (or chamber) 24. The extraction apparatus 10 may additionally comprise a lid 26 with a central hole 28 through which the rod 22 may pass to assist in centering the filtration basket 24 and prevent it from tilting. The filtration basket 24 additionally comprises sealing means 30, such as a rubber sealant, situated at the edge of the first perforated surface or wall 32 of the filtration chamber 24, which is oriented substantially transverse to the vertical axis of the infusing container 12. The purpose of the sealing means is to prevent infusible material 16 from being allowed above the filtration basket 24 as the filtration basket 24 is moved down into the container with mixture of extract 14 and infusible material 16. The first perforated surface 32 is the top surface of the filtration basket 24 and allows the extract 14 to flow through it while the filtration basket 24 is pushed down into the container. In essence, the infusing container 12, the first perforated surface 32 and sealing means 30 of the filtration basket 24 define a first (or mixture) chamber 34 containing the mixture of extract 14 and infusible material 16.

The filtration basket 24 of the plunger 18 also defines a second surface or wall 36 oriented substantially parallel to the first surface 32. The second surface 36 is connected with the first surface 32 by means of side walls 38 (also called the third surface) that are substantially perpendicular to the first surface 32 and second surface 36 as shown, but which in alternative embodiments may slant inward to join a wider first surface with a relatively narrower second surface.

As shown in FIG. 1, the combination of first surface 32, second surface 36 and connecting side walls (or the third surface) 38 form a basket which may be a cylindrical shape or alternatively in the shape of a conical frustum defining a hollow interior space or first filtration chamber 40 which may be accessible by way of access means 42 located in one or more of the first, second or side surfaces. Such access means 42, for example, may include a screw off opening with threaded joints located, for example, between the bottom surface 36 and the side wall 38 allowing the second surface 36 to be removed by screwing the second surface on or off to access the filtration chamber 40. In alternative embodiments, such threaded joints could be located between the first surface 32 and the side walls 38 or at a location along the side walls 38. In alternative embodiments, the access means could be an opening in any of the first surface 32, the second surface 36 or the side walls 38. In alternative embodiments, the opening may be accessible using clipping or other temporary fastening means as known in the industry.

Figure 4:
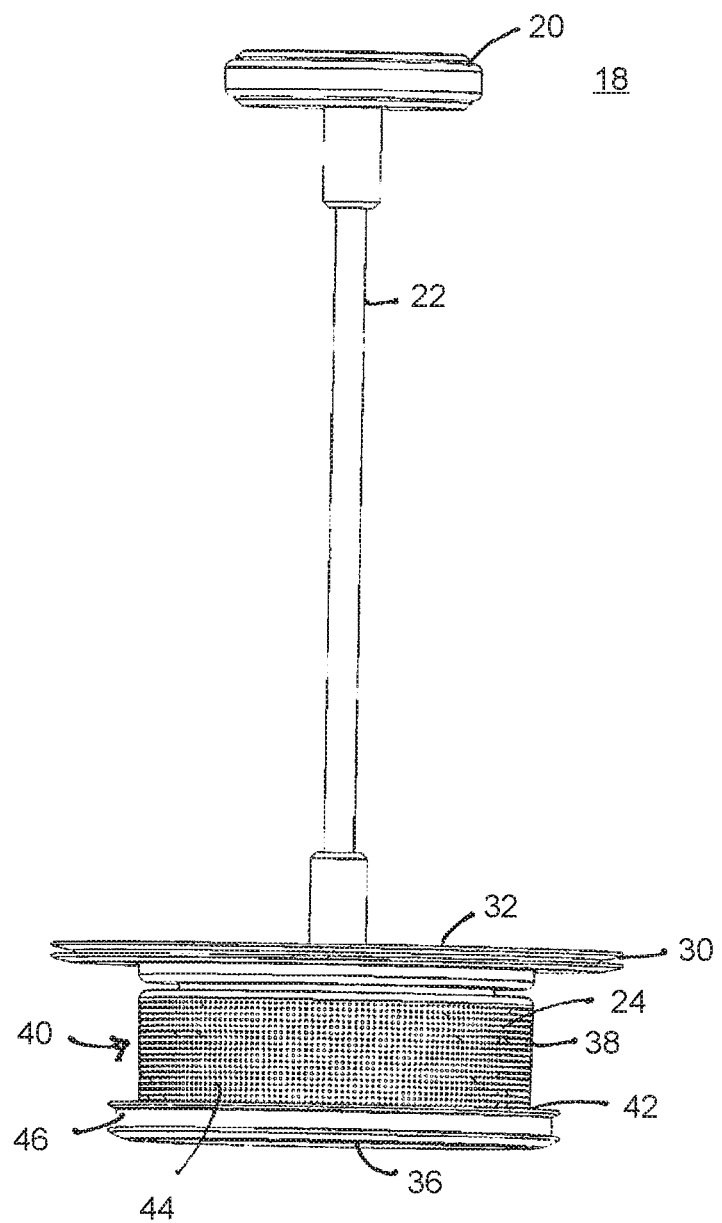
FIG. 4 depicts a side perspective view of an exemplary embodiment of a plunger consistent with the principles of the present disclosure.
Figure 5:
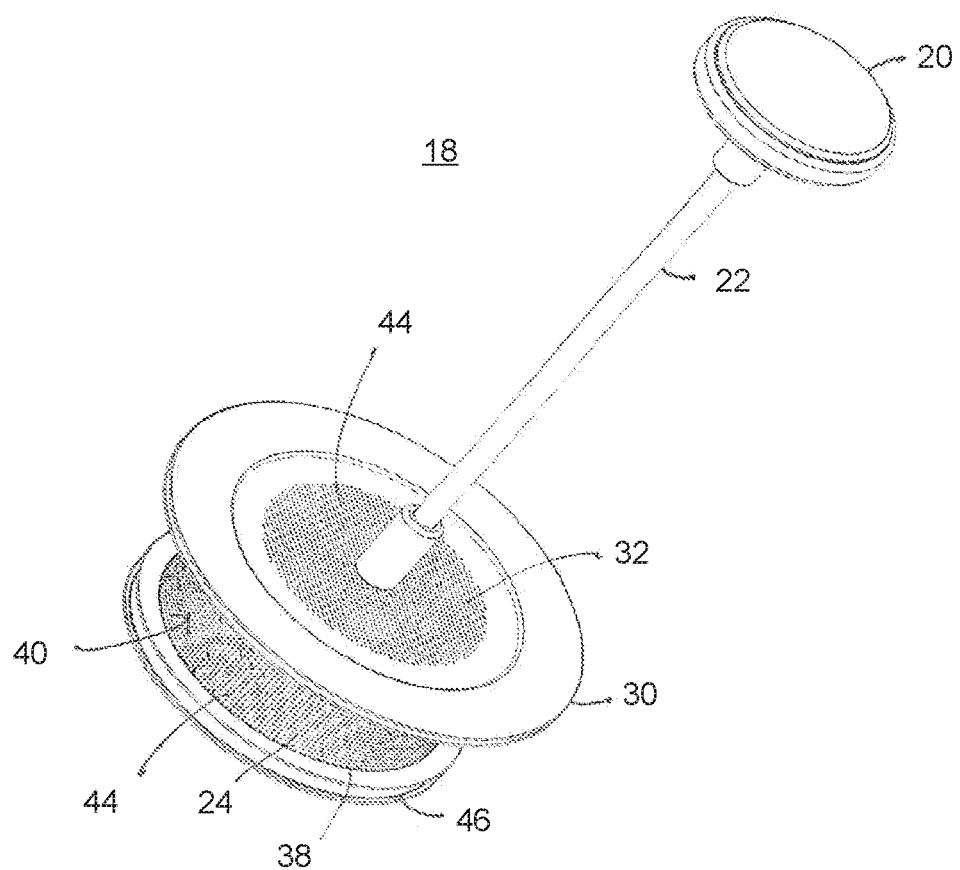
FIG. 5 top side perspective view of the exemplary embodiment of the plunger shown in FIG. 4.
Figure 6:
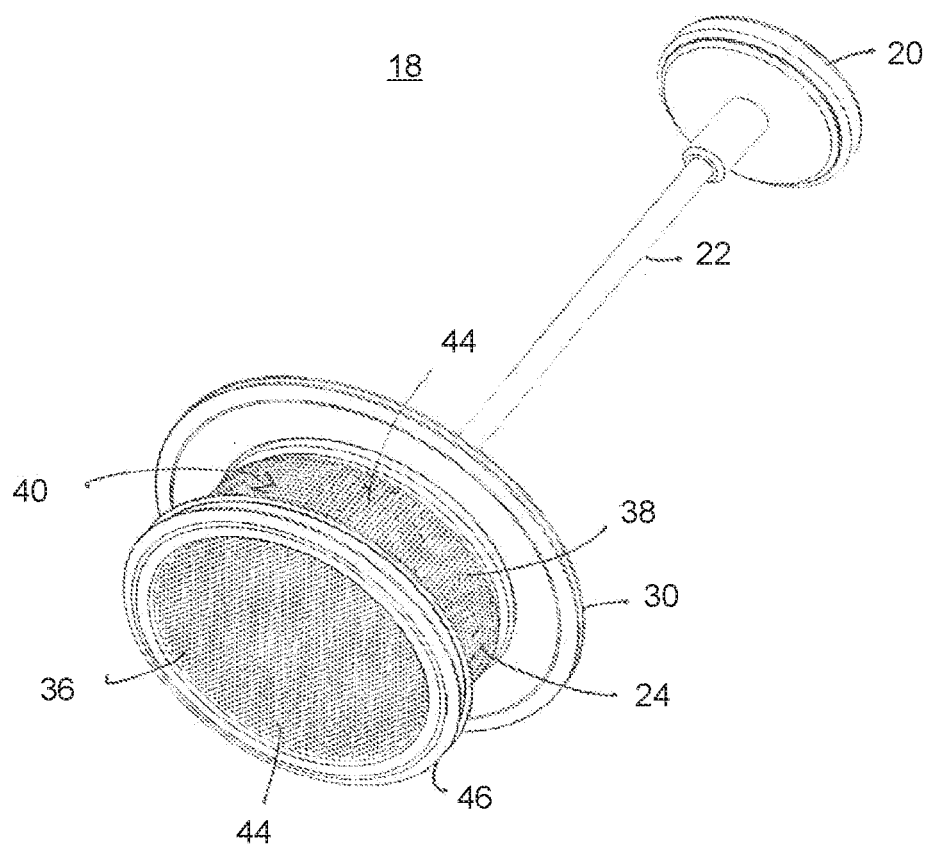
FIG. 6 is a bottom side perspective view of an exemplary embodiment of the plunger shown in FIGS. 4 and 5.

As shown in the exemplary embodiment depicted in FIGS. 4-6, the first surface 32, the second surface 36, and the side walls 38 of the filtration basket 24 are adapted to permit the flow of extract from a first (or mixture) chamber 34 (containing a mixture of extract 14 and infusible material 16) to a second (or filtered extract) chamber 35 (containing only the extract 14). In the embodiment shown, the first surface 32, second surface 36 and side walls 38 comprise one or more filter openings (or perforation holes) 44 adapted such that extract 14 flowing through the filter openings 44 may pass through the filter openings 44 to allow substantial separation of the extract 14 from the infusible material 16. In some embodiments, the apertures of the filter openings 44 may be small enough to substantially exclude the infusible material 16 from passing through the filter openings 44. The filter openings 44 can be the perforations in a substantially perforated surface or may the openings in a mesh material used to form the surfaces of the filtration basket 24. Alternatively, the filter openings 44 may be formed by any suitable method, such as one or more of: stamping, chemical etching, laser etching, molding, weaving, welding, machining, sintering, felting, foaming, paper making, piercing, or any other method adapted to create small and preferably uniform apertures. A common embodiment of the surfaces having filter openings 44 would be a screen or mesh having many apertures comprised of a suitable material as described above. Additionally, the filter openings 44 themselves may be multi-staged, comprising a plurality of individual filter elements (for example, stacked mesh and paper).

In addition to the filter openings 44, one or more of the first surface 32, the second surface 36 and the side walls 38 of the filter basket contains a filtration basket coupling means 46, such as a coupler, for coupling the plunger 18 with the container insert 48. In the embodiment shown in FIGS. 1-3, the coupler 46 may comprise of corresponding double ridge seal 46 made of strong, durable but elastic materials such as silicone or rubber located at or near bottom edge of the third surface (side walls) 38 of the filtration basket 24 which may couple with a ridged node or ring 60 located at the interior surface of the insert. In alternative embodiments, the coupling means consist simply of the double ridged seal 46 which fits snugly down into the insert such that the seal 46 will slide down the interior walls of the insert when the plunger is pushed down, but which will hold enough tension against the interior walls of the insert to temporarily couple with the insert (i.e., provide enough friction) to allow the insert and plunger to be easily pulled up together while holding the infusible material between the third surface of the plunger and the bottom interior surface of the insert. Other alternative coupling means are contemplated by the disclosure including the use of clips, corresponding overlapping rubber or silicone seals or rings, and other equivalent temporary coupling means known in the industry. Such coupler may be detachable when the plunger 18, container insert 48 and infusible material have been pulled out of the container 12 allowing the infusible material 12 to be easily accessed and discarded.

The container insert 48, as shown in FIG. 1, is adapted to be inserted into the filtration container 12 and pushed down along the filtration container 12 vertical access and seated between the bottom of the filtration container 12 such that a portion of the bottom surface of the container insert 48 is seated against the bottom of the filtration container 12. The container insert 48 is a substantially open container design having bottom 50, side walls 52, and rim 54 having interior and exterior surface and the rim 54 also having peripheral sealing means 56 and filtration openings 58. In the exemplary embodiment shown, the rim 54 is beveled (or sloped) inward to allow the infusible material 16 to more easily move down into the insert when the plunging 18 is pushed into the container. The interior surface of the container insert 48 may also have coupling means 60 adapted to be coupled with the filtration basket coupling means 46 as described more thoroughly below.

In some embodiments, the side walls 52 and rim 54 with peripheral sealing means or seal 56 of the container insert 48 are adapted to define a second filtration chamber (or space) 62 between the exterior surfaces of the container insert and the interior surface of the infusion container. In such embodiments, filtration openings 58 are located at the rim 54 to allow extract 14 to flow into the space 62 while substantially preventing the infusible material 16 from flowing therein. In such embodiments, the filtration openings 58 consist of perforated mesh or other opening large enough to allow extract 14 into the space 62 but prevent infusible material 16 from doing so. The peripheral sealing means 56 prevents infusible material from flowing around the rim of the container insert 48 into the chamber 62 while also allowing the insert to be more easily pushed into or pulled out of the infusing container 12 when extract 14 remains in the container 12. In alternative embodiments designed to allow the plunger 18 and container insert 48 to be pulled out of the container only after the extract has been removed, there is no need for the filtration openings 58 at the insert rim 54.

In the exemplary embodiment shown in FIG. 1, the infusing container 12 comprises a substantially vertical walled cylinder container, with a substantially circular cross-section, the first surface 32 of the filtration basket 24 is substantially circular in cross-section adapted to fit inside the cylindrical infusing container 12, and the second surface 36 is substantially cylindrical with a substantially circular cross-section. The side walls 38 of the filtration basket 24 are substantially vertical. Sealing means 30 consisting of a double pointed gasket is situated around the outside edge of the first surface 32 of the filtration basket 24 to provide a seal against the cylindrical wall of the infusing container 12 when the plunger 18 is moved inside the container, to substantially prevent extract 14 material from leaking around the sealing means 30. In alternative embodiments, the infusing container 12 and mating plunger 18 with filtration basket 24 with first surface 32 thereof may optionally have another cross-sectional shape, such as a square or rectangular of other shape for example, wherein the sealing means 30 may be situated around the edge or edges of the first surface 32 of the filtration basket 24. Further, in alternative embodiments, the second surface 36 of the filtration basket 24 may optionally have another shape, such as a rectangular prism or conical frustum, for example. In an alternative embodiment, the plunger 18 having filtration basket 24 may be provided independently, adapted to fit inside an existing infusing container design, for use as an extraction apparatus.

Likewise, and as shown in FIG. 1, the container insert 48 is substantially circular in cross-section and adapted to fit inside the cylindrical infusing container 12. The container insert may be made of any strong, light and moldable material used in the manufacture of press type extract apparatus such as plastic, metal, and other such materials. The sealing means 56 is situated around the substantially circular outside edge of the insert rim 54 to provide a seal against the cylindrical wall of the infusing container 12 when the container insert 48 is moved inside the infusing container 12 and is seated at the bottom of the infusing container 12 to substantially prevent infusible material 16 from leaking around the sealing means 56 when the extract 14 and infusible material 16 are pushed downward along the vertical axis of the infusion container 12 during use. In alternative embodiments, the infusing container 12 and mating container insert 48 may optionally have another cross-sectional shape, such as a square or rectangular or other shape for example, wherein the sealing means 56 may be situated around the edge or edges of the insert rim 54. Further, in alternative embodiments, the container insert 48 may be provided independently, adapted to fit inside an existing infusing container design. In such an embodiment, the plunger 18 with filtration basket 24 as well as the mating container insert 48 may be adapted for retrofittable use with one or more existing infusing containers, such as one or more standard or commonly available infusing containers from existing French press extraction apparati, as are known in the art.

In one embodiment of the present disclosure, the infusing container 12 may be made from any suitable material such as one or more of: glass, plastic, ceramic, metal or other suitable material, for example. Additionally, the infusing container 12 may optionally include a double-layered wall, such as a double metal wall, with a vacuum or other suitable and preferably insulative substance between the two walls of the infusing container 12 during the extraction process. Further, the plunger 18, container insert 48, and components thereof may be made from any suitable material such as one or more of polymer, composite, metal, ceramic or other suitable materials, for example.

The first surface sealing means 30 as well as filtration basket coupling means 46 and the peripheral container insert sealing means 56 may comprise any suitable known seal material and/or design. Such sealing means designs may include single or multiple lip seals, single or multiple wiper seals, single or double ridged seals, and single or multiple U-cup seal designs, for example. Suitable such single or multiple U-cup seal designs may desirably be self-energizing, such that an outer edge of the U-cup seal actively engages and seals with the inner wall of the infusing container 12 or container insert 48 while allowing the plunger to be pushed down into the container 12. Exemplary suitable seal materials may comprise one or more of: silicone, polymers (such as polyurethane for example) and silicone or polymer materials impregnated with carbon or other additives. Additionally, sealing means (30, 46 and 56) may comprise one or more such suitable seal materials by themselves, or alternatively, such seal materials may surround or be overmolded over a support material, such as a metal or composite support material, for example. The above described exemplary sealing means materials and designs may also apply to sealing means incorporated in other embodiments, such as those described herein.

As shown in the exemplary embodiment of FIG. 1 and described above, the filtration basket 24 has coupling means 46 configured to mate with corresponding coupling means 60 located on the inside walls of the container insert 48. The purpose of the coupling means is to provide a temporary engagement between the plunger 18 and the container insert 48 when the plunger 18 is pushed down into the infusion container 12 containing the container insert 48 such that the walls of the filtration basket 24 of the plunger 18 are within the concave walls of the container insert 48 and the infusible material 16 has been trapped at the bottom between the second surface 36 of the plunger 18. The coupling of the filtration basket and the insert allows the plunger 18 and container insert 48 to be pulled up together holding the infusible material, substantially removing the infusible material from the filtration container 12. Thus, the coupling must be strong enough to hold while the plunger 18 and container insert 48 are being pulled up together. In the example shown a single corresponding coupling means is utilized. In alternative embodiments, more than one coupling means may be utilized. In embodiments having filtration openings 58 located at the rim of the container insert 48, such openings would allow the extract to flow from the first chamber through to a third chamber (defined between the outer surface of the insert and the container bottom) as the plunger 18 and container insert 48 are being pulled up and out of the filtration container 12 while extract remains in the container 12. In this way, the infusible material 16 may be pulled out of the container leaving the extract 14 behind in the infusion container 12. Such filtration openings 58 are also helpful, however, in preventing a vacuum to build up in the space 62 between the container and the insert which would otherwise inhibit the container insert 48 from being pulled up even if the extract has already been poured away from the container 12. In such embodiments, it may be preferable for the insert to have perforations in the sides and/or bottom to increase the ease in which the insert may be pulled in or out of the container with liquid contained therein.

As noted above, one example of corresponding coupling means is shown in FIG. 1 which includes a circular banded protrusion located at the side walls 38 of the filtration basket 24 and corresponding circular banded protrusion 60 located at the interior surface of the container insert 48 at a location below the insert rim 54. The corresponding banded coupling means of the filtration basket and container insert are elastic enough to allow the filtration basket to be pushed into the container insert far enough that the coupling means of the filtration basket will move beyond the coupling means of the insert when the plunger 18 is pushed down into the container insert 48 such that the infusible material is lodge (caught or otherwise pressed) between the second surface of the filtration basket and the bottom inside surface of the container insert. Once the coupling means is engaged as described, the coupling means must be strong enough to remain engaged while the plunger 18 with container insert 48 is pulled from the container. But the coupling means must also allow for easy detachment of the plunger from the insert when the two have been removed from the container to allow the spent infusible material 16 to be removed.

Examples of alternative coupling means may include other fasteners such as hook and loop (Velcro), clips, suction cups or even threaded (i.e., screw in) type means which would allow the filtration basket to engage with the insert and be pulled up through the container and subsequently disengaged without difficulty. In some embodiments, the coupling means may consist of a silicone seal 46 that presses against the interior surface of the container insert 48 as it moves downward and fits snugly enough to allow the plunger 18 and container insert 48 to be pulled up together without decoupling. In such embodiments, it may not be necessary to have a corresponding protruding nub or ring 60 at the interior surface of the insert. And, such arrangement may be actually beneficial in insuring a greater compression of the infusible material at the bottom of the insert as the plunger will not be inhibited by the location of such corresponding coupling means.

In some common exemplary embodiments, the extraction apparatus 10 may be configured for extracting a hot beverage extract 14 from infusible plant material 16, such as in embodiments where infusible material 16 may comprise coffee grounds, tea leaves or herbal infusibles, for example, and extract 14 may comprise coffee, tea or herbal tisane, respectively. In the common example of coffee extraction, the extraction ground coffee infusible material 16 may result in a coffee extract 14.

Figure 2:
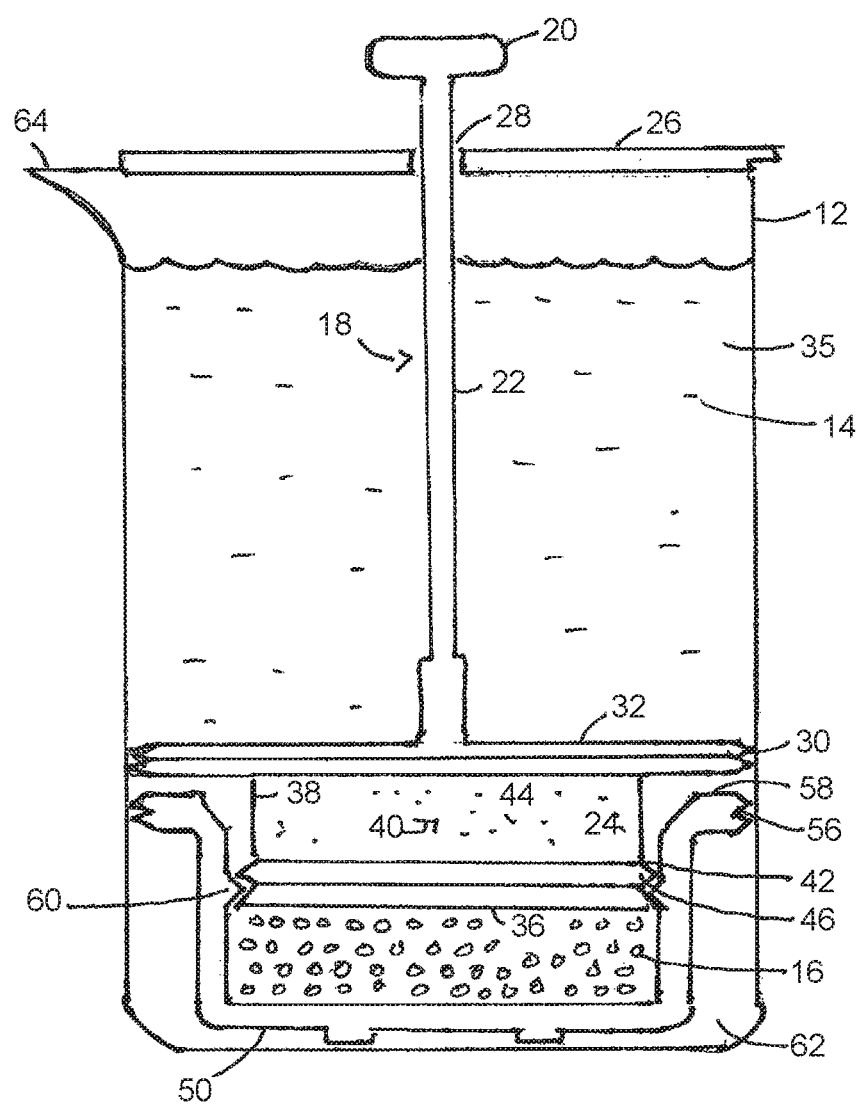
FIG. 2 depicts a vertical section of the exemplary embodiment shown in FIG. 1 with plunger pressed down through the container containing the mixture and coupled with the container insert such that the infusing material is trapped between the plunger and the insert.

FIG. 2 shows the extraction apparatus of FIG. 1 in a second position where the plunger 18 has been moved along the vertical axis of the container 12 such that the filtration basket 24 is coupled with the container insert 48 with the infusible material 16 sandwiched between the second surface 36 of the filtration basket 24 and the bottom interior surface of the container insert 48.

As the plunger 18 is moved in the infusing container 12 containing the mixture of extract 14 and infusible material 16, extract 14 will flow through one or more of the second surface 36, the side walls 38 and the first surface 32 of the filtration basket 24. Once the filtration basket 24 is moved down into the container insert 48, the extract has been substantially separated from the infusible material 16 and the infusible material 16 may be stored between the filtration basket 24 and the container insert 48 until desired for use without further contact with the infusible material 16.

The infusing container 12 may also optionally include a pouring spout 64, which may be used to pour the separated extract 14 from the infusing container 12 for consumption or other use. The infusing container 12 may further, optionally, include a handle (not shown) to facilitate lifting or moving the extraction apparatus 10 by a user.

One will note in looking at FIG. 2 that the plunger 18 is coupled with the container insert 48 in that the coupling means 46 of the filtration basket 24 which, in this embodiment, comprises essentially a silicone band located on the lower side walls 38 of the filtration basket 24, has mated with the corresponding coupling means 60 of the container insert 48 which, in the embodiment shown, is a silicone band located on the upper portions of the inner side walls 52 of the container insert 48. While the corresponding coupling means is elastic enough to allow coupling, they prevent the plunger 18 from de-coupling with the container insert 48 when the plunger 18 and container insert 48 are pulled out of the infusing container 12.

Figure 3:
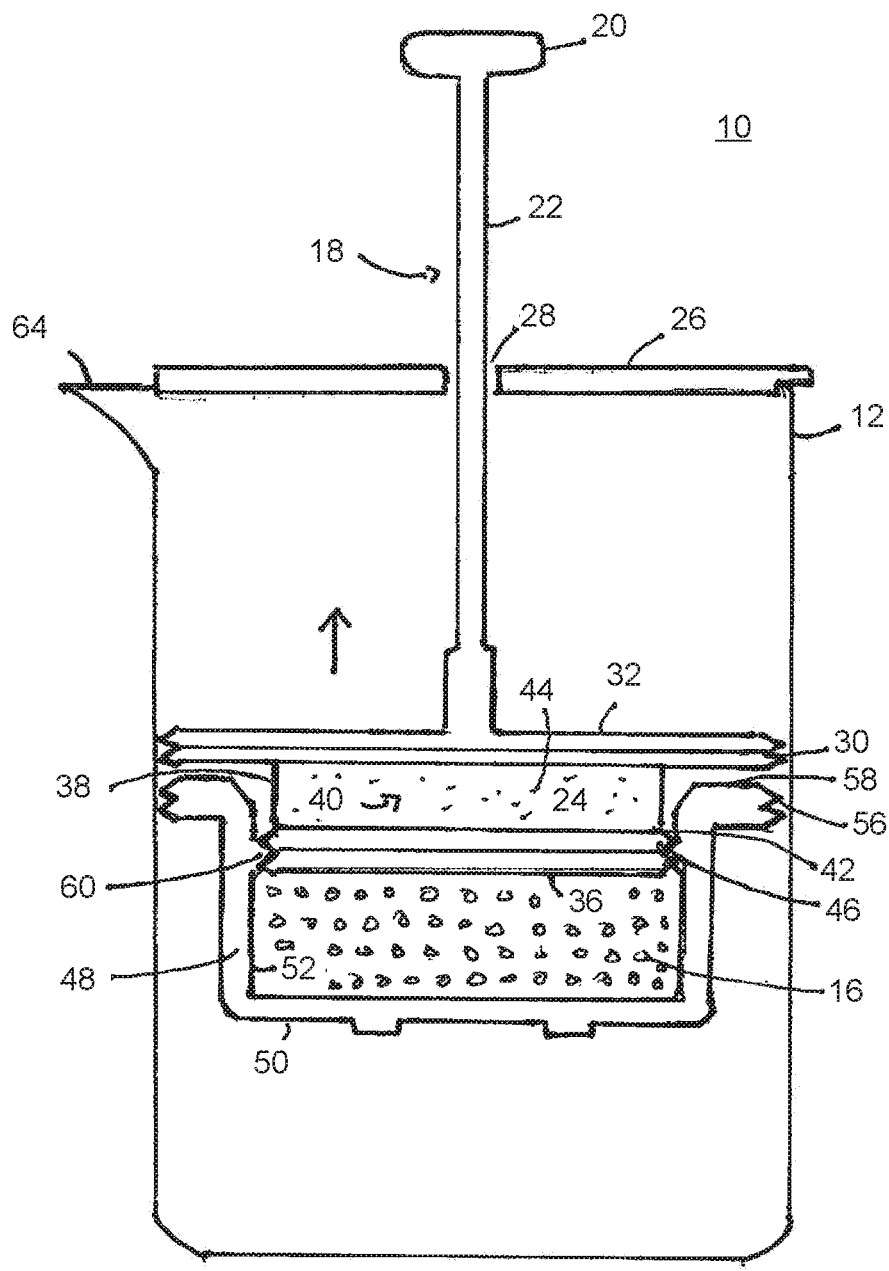
FIG. 3 depicts a vertical section of the exemplary embodiment shown in FIGS. 1 and 2 with plunger coupled with the insert and being pulled out of the infusing container with the infusing trapped between the plunger and insert.

FIG. 3 shows the extraction apparatus of FIGS. 1 and 2 in a third position wherein the plunger 18 coupled with the container insert 48 is being pulled out of the infusing container 12, substantially removing the infusible material 16 from the infusion container 12. In the example shown, the extraction of the plunger 18, container insert 48 and infusible material 16 is done after the extract has been removed from the container. However, in alternative embodiments, the extraction may be done while extract remains in the infusing container 12. In such embodiments, it would be required that some method of allowing the extract to flow into the space 62 between the insert 48 and the bottom of the container 12. This can be accomplished because the insert filtration openings 58 located in the rim 54 of the container insert 48 allow the extract to pass between the chamber containing only extract (which in this example is the second chamber 35) and the space 62 which is between the exterior surface of the container insert 48 and the bottom of the infusing container 12. During this process of pulling the coupled plunger 18 and container 48 up together through the extract 14, the extract will flow from the second chamber 35 through the filtration basket 24 and through the insert filtration openings 58, effectively filtering the extract 14 again. In alternative embodiments, the container insert 48 does not have filtration openings 58 in which case it would be difficult to pull the coupled container insert 48 up and through the infusing container 12 with extract still contained therein. With such embodiments, the user would need to consume or otherwise empty the extract 14 into another container before pulling the coupled plunger 18 and container insert 48 from the infusing container 12. However, as previously mentioned, such filtration openings 58 are helpful for alleviating a vacuum seal that may form between the insert and the container and thus prevent the insert from being easily removed.

FIG. 4 is a vertical section of an exemplary embodiment of a plunger 18 configured similarly to a French press type coffee and/or tea making plunger adapted to fit within an infusing container similar to that shown in FIGS. 1-3, and to be moved within the infusing container (not shown) along a vertical axis thereof, by means such as the elongated handle means comprised, in this embodiment, of a rod 22 attached at one end to an optional knob 20 and at the other with a filtration basket 24. One will note that the filtration chamber 40 is defined by the first surface 32, second surface 36 and third surface (or side wall) 38 of the filtration basket 24. The chamber 40 may be accessible by access means 42 which in this example is located at the junction between the second surface 36 and third surface 38 by means of a screw off access (threads not shown). The coupling means 46 consist of a double edged gasket that fits over a protrusion 60 (shown in FIGS. 7-9) in the insert. The perforations 44 in the first surface 32, second surface 36 and third surface 38 are designed to be large enough to allow extract to flow into and out of the chamber 40 while being small enough to substantially prevent the infusible material from flowing in or out. In alternative embodiments, the chamber is accessible to allow for additional filtration means (such as paper filters) to be utilized within the filter chamber 40. Access to the filter chamber is essential in this case to allow for placement and removal of such additional filtration means. However, is alternative embodiments where additional filtration means isn't needed or where the additional filtration means consists of a permanently placed material (such as a specialized sponge or mesh) such access may not be required.

FIG. 5 top side perspective view of the exemplary embodiment of the plunger shown in FIG. 4. This view shows that the first filtration surface 32 is perforated as is the third surface 38. In some alternative embodiments, the third surface (i.e., the walls of the filtration basket 24) are solid or otherwise do not allow the extract to flow through. In alternative embodiments, the sizes of the filtration openings 44 may be different for the first surface 32, second surface 36 and third surface 38 filtration surfaces in order to adjust the amount of infusible material that is left behind in the extract. In some embodiments the filtration openings 44 located at the first filtration surface 32 may be larger in order to allow more extract to flow out the top as the plunger is pressed downward. In some embodiments, the first filtration surface 32 is eliminated—in other words creating an open chamber 40 at the top and the rod 22 is instead connected with the second or bottom surface 36.

FIG. 6 is a bottom side perspective view of an exemplary embodiment of the plunger shown in FIGS. 4 and 5. In this view, the bottom filtration surface 36 of the filtration basket 24 is visible. One will note that the coupling means 46 is located peripheral to the joint between the second surface 36 and the third surface 38 (i.e., the walls of the filtration basket 24). In alternative embodiments, additional or alternative coupling means may be located at mid-point locations around the third surface 38 and will correspond to coupling means 60 located at the interior surface of the container insert 48.

Figure 7:
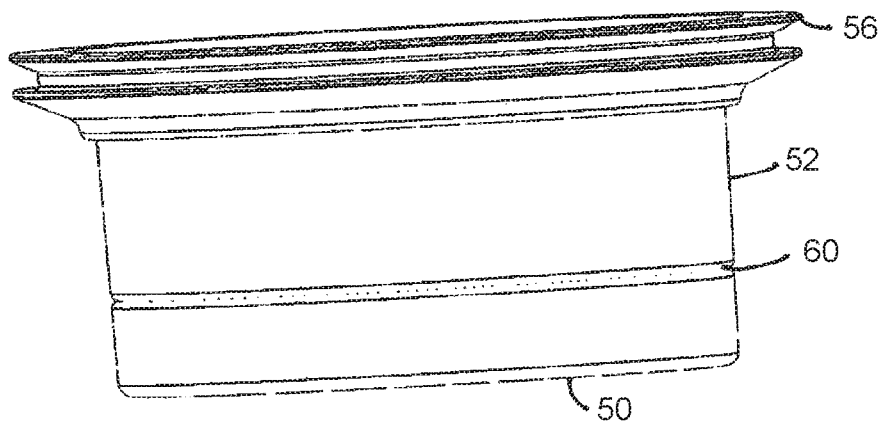
FIG. 7 is a side perspective view of an exemplary embodiment of a container insert consistent with the principles of the present disclosure.

FIG. 7 is a side perspective view of an exemplary embodiment of a container insert consistent with the principles of the present disclosure. In this view, the peripheral seal 56 is located at the top of the insert near the rim and consists of a double lipped gasket preferably made of silicone or similar strong and elastic material. One will note that the bottom 50 of the container insert 48 may be made of or covered by a gasket of relatively elastic or soft material that would guard against damage to the container when the plunger 18 is pressed firmly into the insert. As seen in FIGS. 1-3 as well as FIG. 9, the bottom of the container insert 48 is not (preferably) flat. This is to help prevent the insert from becoming stuck (by way of vacuum or liquid adhesion) on the bottom of the container inhibiting the insert from being pulled up when coupled with the plunger. One will note that the corresponding coupling means 60 located on the insert is visible as a banded portion of the insert side wall that is recessed inward (bent inward toward the center of the insert) providing a banded protrusion on the interior surface of the insert. It is not required that the exterior of the insert be recessed in this way as long as the corresponding coupling means (in this case the banded protrusion) is located on the interior surface.

Figure 8:
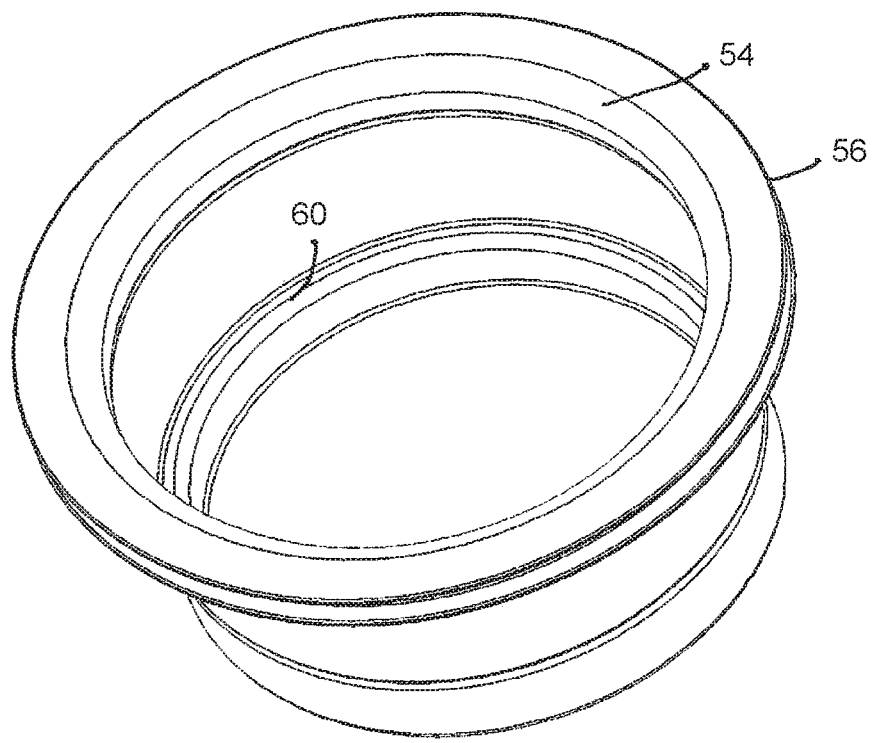
FIG. 8 is a top side perspective view of the exemplary embodiment of the container insert shown in FIG. 7.

FIG. 8 is a top side perspective view of the exemplary embodiment of the container insert shown in FIG. 7. In this view the beveled rim 54 as well as the interior coupling means 60 are visible. One will note that this view does not include the filtration openings 58 (not shown) at the rim of the insert. If such openings were present, they would be located at the rim 54 or at the peripheral seal adjacent the rim 54. The purpose of such openings 58 which are optional is clearly described above.

Figure 9:
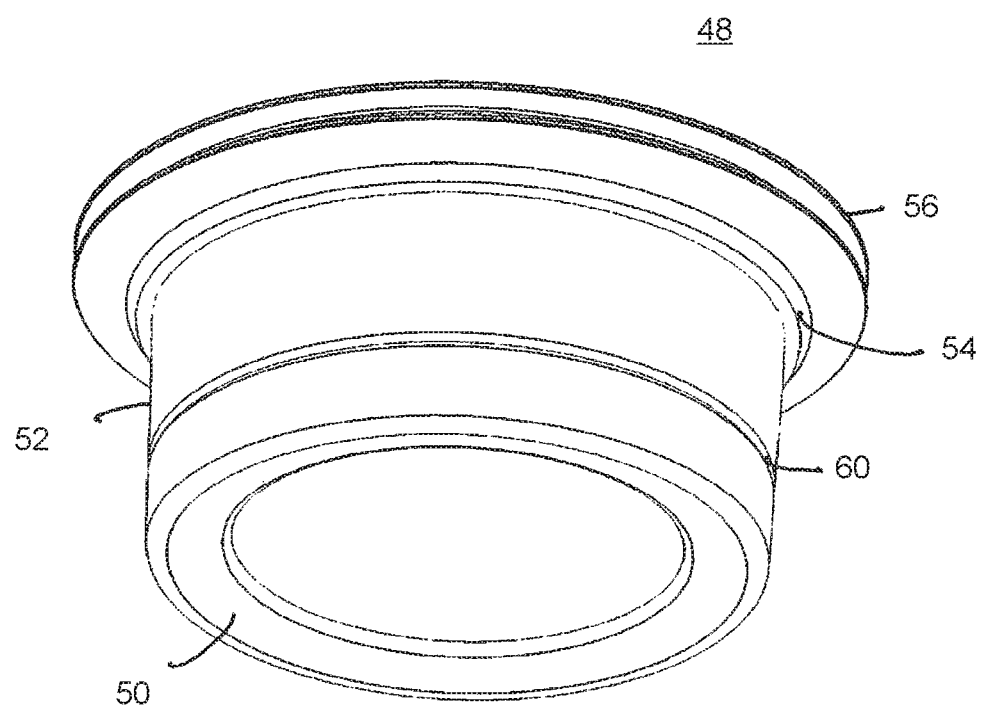
FIG. 9 is a bottom side perspective view of the exemplary embodiment of the container insert shown in FIG. 8.

FIG. 9 is a bottom side perspective view of the exemplary embodiment of the container insert shown in FIG. 8. One will not the beveled bottom surface 50 of the insert which may preferably be made of elastic or soft materials to guard against the force caused by pressure on the insert from the plunger being pushed into the insert during the use from damaging the container (which may be made of glass, ceramic or other breakable material) and to prevent a vacuum seal from inhibiting the removal of the insert from the bottom of the container. Again, as described above, it is not necessary that the banded coupling means 60 be visible as a recessed band from the exterior surface of the insert but such configuration may be preferable for manufacturing purposes. The peripheral seal 56 and the beveled rim 54 are also visible as noted.

Figure 10:
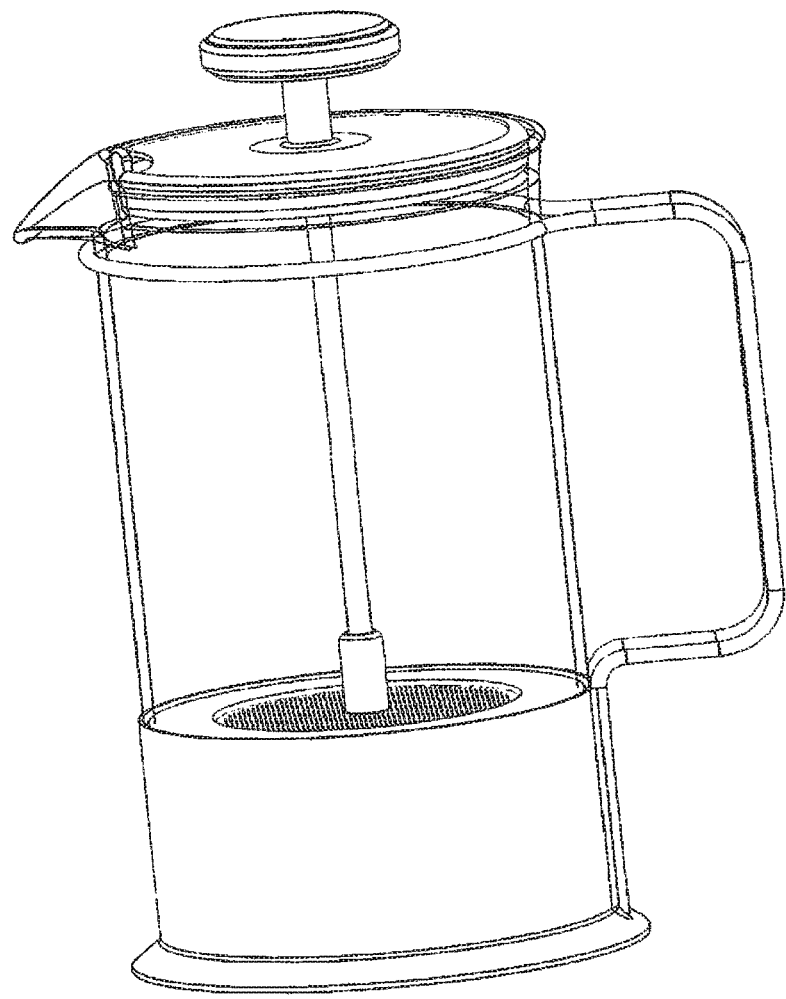
FIG. 10 is a perspective view of an exemplary embodiment of an apparatus consistent with the principles of the present disclosure.

FIG. 10 is a perspective view of an exemplary embodiment of an apparatus consistent with the principles of the present disclosure. This embodiment of the apparatus is housed within a clear container with a separate solid base with extending handle that surrounds and holds the container. In other words, the clear container sits down into a base and may be removed therefrom for cleaning and other purposes. The top of the base is substantially flush with the sealing means of the plunger when the plunger is fully pressed into the insert located at the bottom of the container (but hidden from view by the solid base) in this view.

The method for using the embodiments described in FIGS. 1-10 include the steps of placing the container insert 48 at the bottom of a container, placing infusible material 16 (such as coffee grounds or tea leaves) in the container insert 48, pouring hot water or other liquid into the container, inserting and centering the plunger 18 in the container and optionally placing the lid 26 on the container 12. Once the infusible material has had enough time to steep in the liquid, the next step is for the user to push down on the knob 20 of the plunger 18 to move the filtration basket 24 down into the container insert 48 such that the infusible material is separated from the extract 14 and the corresponding coupling means 46 and 60 have mated with infusible material trapped between the bottom of the filtration basket and the interior surface of the container insert 48. The extract may then be poured out of the container. In some embodiments (described above) having means (such as filtration openings 58) for allowing the extract to flow to the space 62 defined between the exterior surface of the container insert 48 and the container bottom, the extract may remain in the container 12 while the plunger 18, container insert 48 and spent infusible material are removed. To remove the plunger 18, container insert 48 and infusible material, the user pulls up on the plunger handle 20 to extract them from the container. Once removed, the plunger 18 may be uncoupled from the container insert 48 and the spent infusible material (coffee grounds or tea leaves, for example) removed. In embodiments where there filtration chamber 40 is accessible, the filtration chamber may be accessed to remove any paper (or other) filter placed therein and for cleaning.

Figure 11:
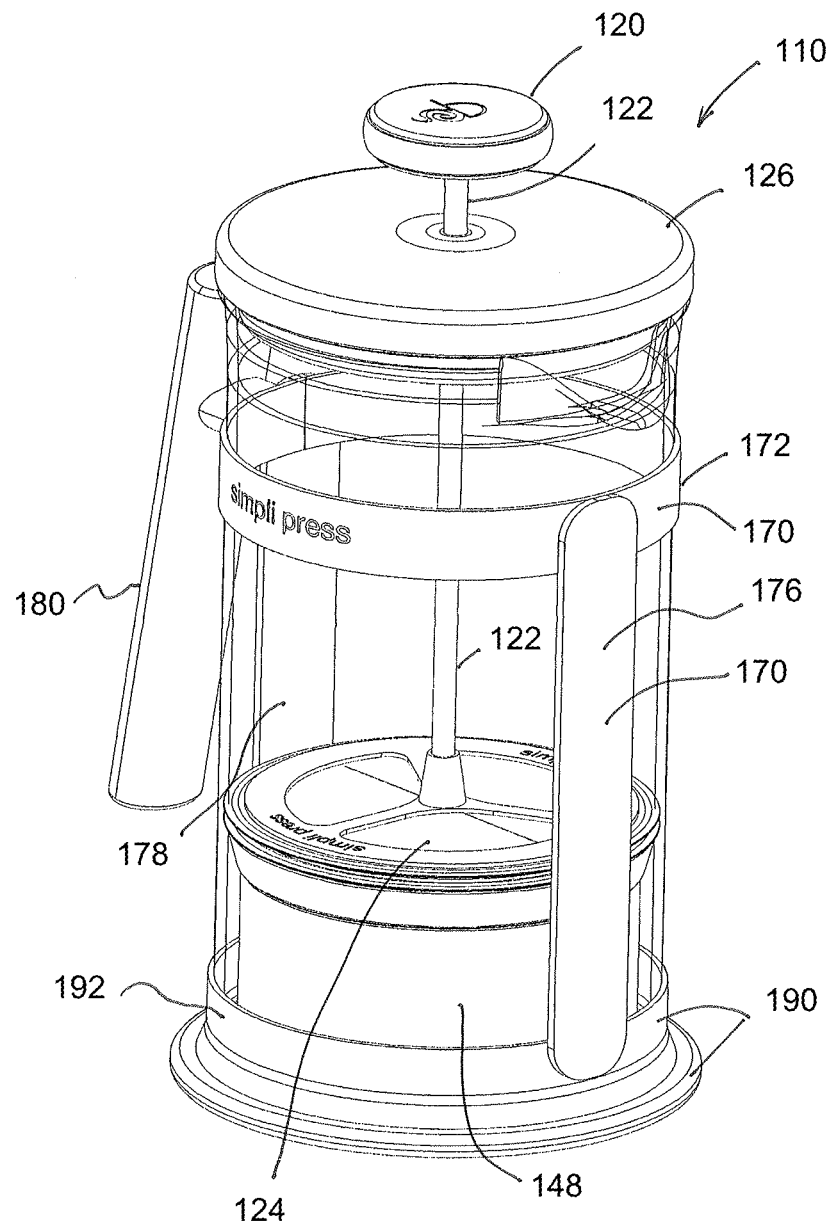
FIG. 11 is a perspective view of another exemplary embodiment of an apparatus consistent with the principles of the present disclosure.

FIG. 11 is a perspective view of another exemplary embodiment of an apparatus 110 consistent with the principles of the present disclosure. In one embodiment, the operations and components of apparatus 110 shown in FIG. 11 may be substantially the same as that of the apparatus 10 shown in FIGS. 1-10 and corresponding descriptions above.

Figure 12:
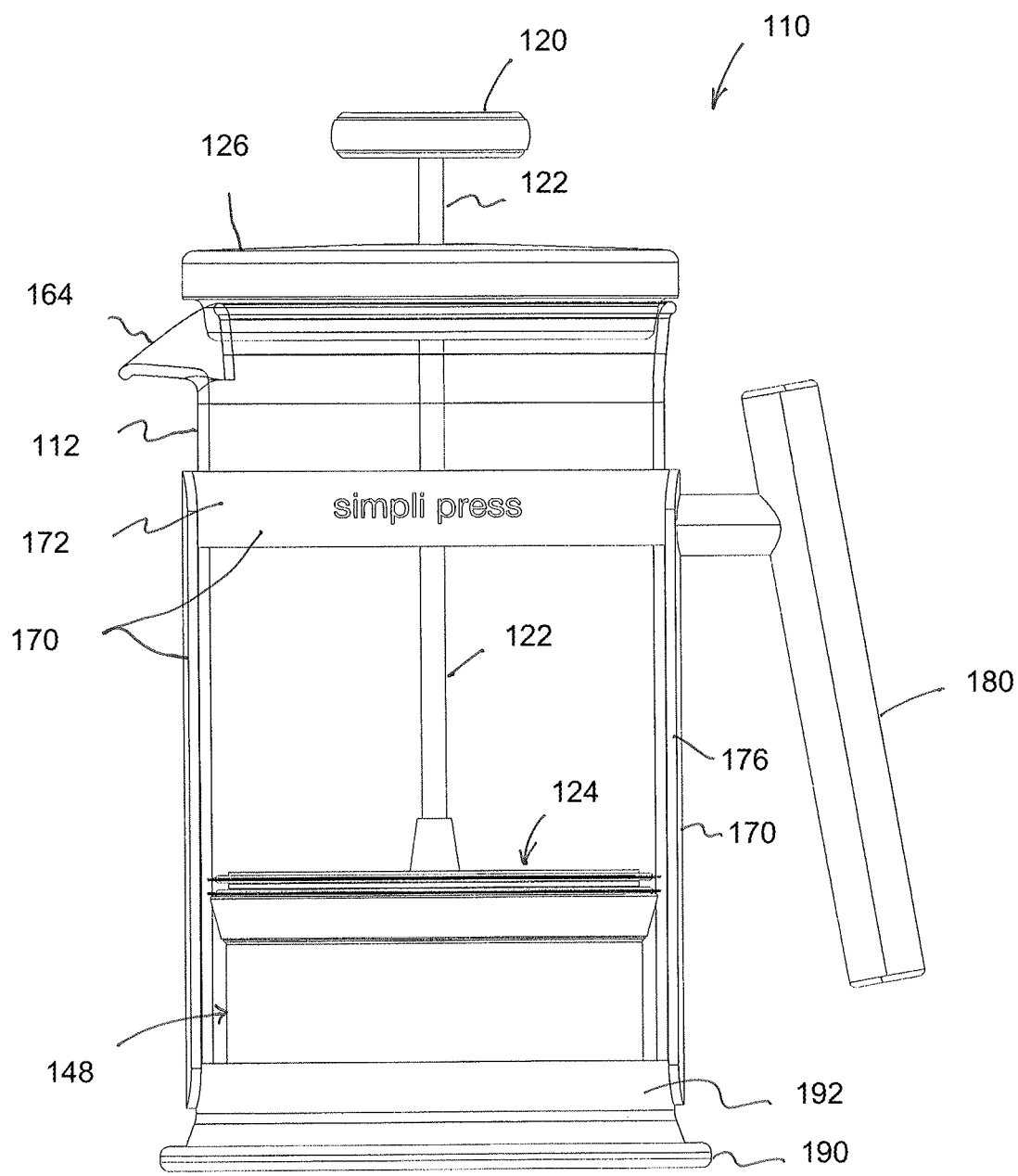
FIG. 12 is a front view of the apparatus shown in FIG. 11.
Figure 13:
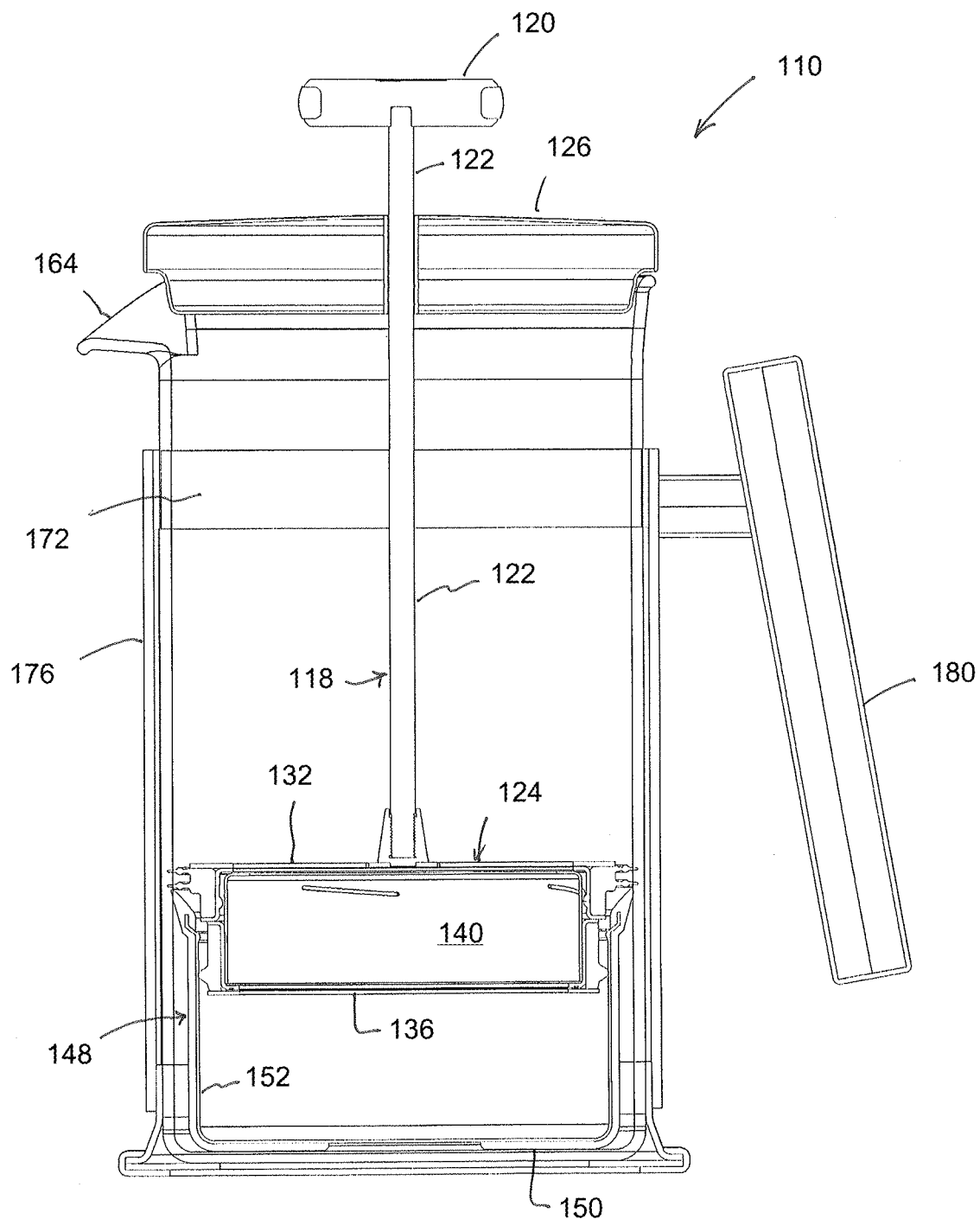
FIG. 13 is a cross-sectional view taken along a plane encompassing a central vertical axis of the apparatus and is also parallel to the paper of FIG. 12.

FIG. 12 is a front view of the apparatus 100 shown in FIG. 11. FIG. 13 is a cross-sectional view of FIG. 12. Referring to FIGS. 11-13, the apparatus 110 has a cylindrical infusing container 112 which comprises a substantially vertical walled cylinder container, with a substantially circular cross-section. The infusing container 112 may be made from any suitable material such as one or more of: glass, plastic, ceramic, metal or other suitable material, for example. In addition, the infusing container 112 may optionally include a double-layered wall, such as a double metal wall, with a vacuum or other suitable and preferably insulative substance between the two walls of the infusing container 112 during the extraction process.

A frame structure 170 may be provided around the container 112 to reinforce the container 112 from damage. The frame structure 170 can comprise one or more full or partial ring element 172 and one or more vertical elements 176, 178. A base 190 can be provided in which the container 112 sits. The base 190 can be configured to have a wall 192 where the vertical elements 176, 178 of the frame structure 170 can be coupled to, and collectively to form a reinforced protective structure to protect the container 112. The frame structure 170 and the base 190 can be made of material such as metal, plastic or other materials. In one embodiment, the container 112 is not user removable from the frame structure 170 and the base 190. In another embodiment, the container 112 may be removed by the user from the frame structure 170 and the base 190 for cleaning and/or other purposes. A handler 180 can be provided and, for example, attached to the frame structure 172 to facilitate the pouring out of the extract from the container 112. As shown in FIGS. 11-13, the plunger 118 is pressed down through and coupled with the container insert 148.

Figure 14:
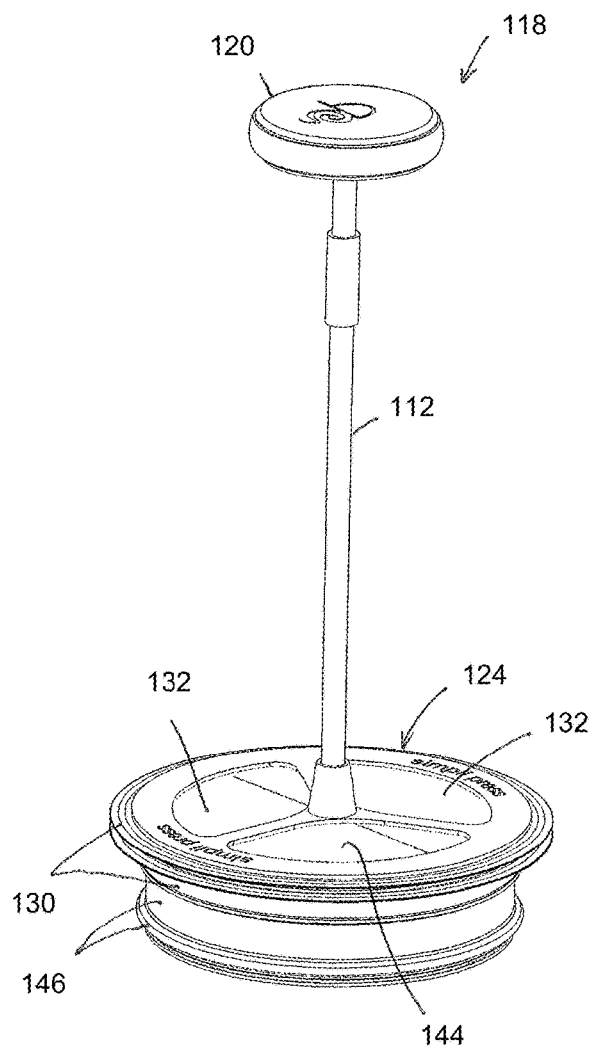
FIG. 14 is a perspective view of another exemplary embodiment of a plunger consistent with the principles of the present disclosure.
Figure 15:
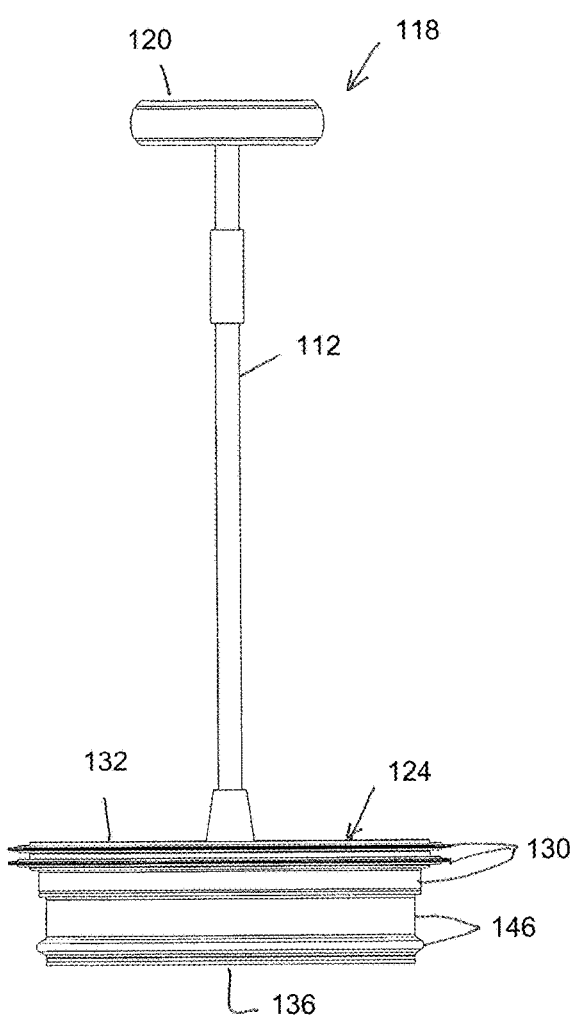
FIG. 15 is a front view of the plunger shown in FIG. 14.
Figure 16:
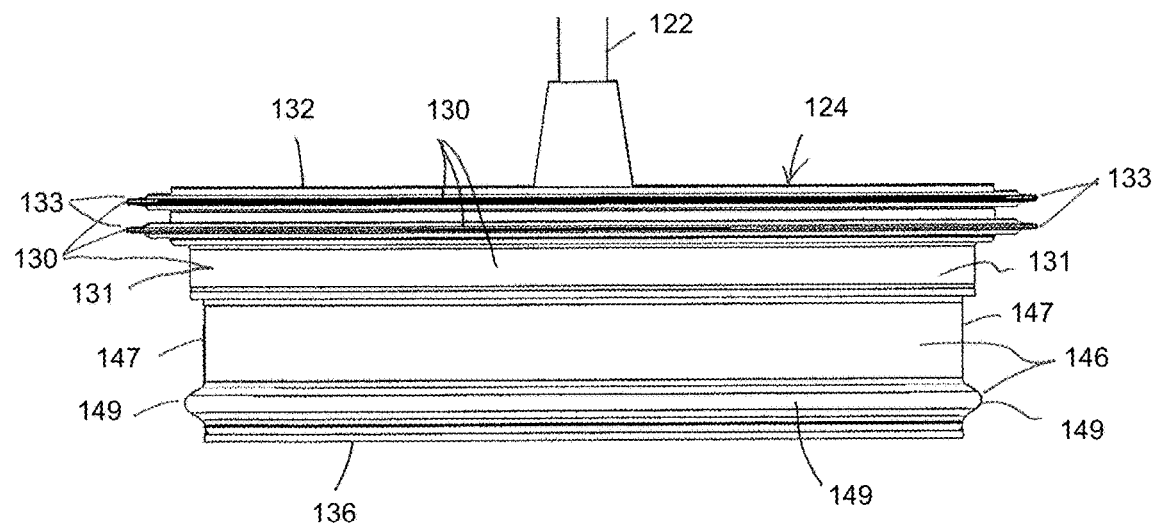
FIG. 16 is an enlarged view shown a portion of FIG. 15 depicted with another exemplary embodiment of a filtration basket of the plunger.
Figure 17:
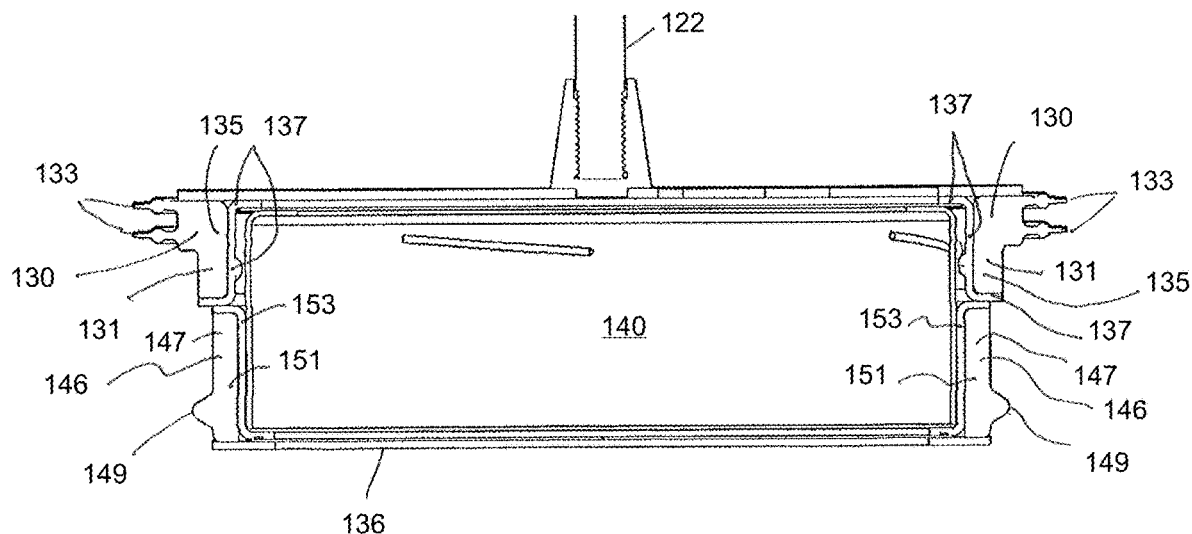
FIG. 17 is a cross-sectional view taken along a plane encompassing a central vertical axis of the plunger and is also parallel to the paper of FIG. 16.

Referring now to FIGS. 14-17, wherein FIG. 14 is a perspective view of another exemplary embodiment of a plunger 118; FIG. 15 is a front view of the plunger 118 shown in FIG. 14; FIG. 16 is an enlarged view shown a portion of FIG. 15 depicted with another exemplary embodiment of a filtration basket 124 of the plunger 118; and FIG. 17 is a cross-sectional view of FIG. 16.

The filter or filtration basket or filtration chamber 124 comprises a perforated first or top surface or wall 132, which is oriented substantially transverse to the vertical axis of the infusing container 112. The first surface 132 is substantially circular in cross-section adapted to fit inside the cylindrical container 112. The perforated top surface 132 allows the extract to flow while the filtration basket 124 is pushed down into the container 112.

The filtration basket 124 also defines a second or bottom surface or wall 136 oriented substantially parallel to the first surface 132. The second surface 136 is connected with the top surface 132 by means of side wall 138 (also called the third surface) that are substantially perpendicular to the top surface 132 and second surface 136 as shown. The second surface 136 can also be substantially cylindrical with a substantially circular cross-section. In one embodiment, the second surface 136 is perforated.

As shown in FIGS. 14-17, the side wall 138 of the filtration basket or filter 124 is substantially vertical (i.e., parallel to the vertical axis of the infusing container 112). In one embodiment, the side wall 138 is perforated. In another embodiment, the side wall 138 are not perforated. In the case when the side wall 138 is not perforated, the side wall can be a solid wall made of rigid or flexible material.

In one embodiment, the combination of top surface 132, bottom surface 136 and connecting side wall 138 (the third surface) form a filtration basket 124, which may be a cylindrical shape as shown in FIGS. 14-17, defining a hollow interior space or first filtration chamber 140 which may be accessible by way of access means located in one or more of the first, second or side surfaces. Such access means, for example, may include a screw off opening with threaded joints located, for example, between the bottom surface 136 and the side wall 138 allowing the bottom surface 136 to be removed by screwing the second surface on or off to access the filtration chamber 140. In alternative embodiments, such threaded joints could be located between the top surface 132 and the side wall 138 or at a location along the side wall 138. In alternative embodiments, the access means could be an opening in any of the top surface 132, bottom surface 136 or side wall 138. In alternative embodiments, the opening may be accessible using clipping or other temporary fastening means as known in the industry.

In the embodiment shown, the first surface 132, second surface 136 and side wall 138 may comprise one or more filter openings (or perforation holes) 144 adapted such that extract may pass through the filter openings 144 to allow substantial separation of the extract from the infusible material. In some embodiments, the apertures of the filter openings 144 may be small enough to substantially exclude the infusible material from passing through the filter openings 144. The filter openings 144 can be the perforations in a substantially perforated surface or may the openings in a mesh material used to form the surfaces of the filtration basket 124. Alternatively, the filter openings 144 may be formed by any suitable method, such as one or more of: stamping, chemical etching, laser etching, molding, weaving, welding, machining, sintering, felting, foaming, paper making, piercing, or any other method adapted to create small and preferably uniform apertures. A common embodiment of the surfaces having filter openings 144 would be a screen or mesh having many apertures comprised of a suitable material as described above. Additionally, the filter openings 144 themselves may be multi-staged, comprising a plurality of individual filter elements (for example, stacked mesh and paper).

The filtration basket 124 comprises a top or first seal 130 situated at the edge of, or slightly below, the first perforated surface or wall 132 of the filtration chamber 124. The top seal or top band 130 can provide a sealing with the interior surface of the container 112 to prevent infusible material from being allowed above the filtration basket 124 as filtration basket 124 is moved down into the container with mixture of extract and infusible material. In essence, the container 112, the perforated top surface 132 and the top seal 130 define a first chamber 134 containing the mixture of extract and infusible material.

In the embodiment shown in FIGS. 14-17, the top seal 130 is a double ridged seal which can fit snugly with the interior walls of the container 112 when the plunger 118 is pushed down along the container 112. The top seal 130 may be in the form of a ring-shaped or band-shaped seal having a base or peripheral portion 131 and at least one sealing tip 133. The top seal 130 may be a unitarily formed or molded element including the base or peripheral portion 131 and the one or more sealing tips 133. The base portion 131 can be installed or positioned in a top or first seal compartment 135 which can be formed by the top surface 132 and a top or first frame 137 extended from the top surface 132 to the side wall 138. In one embodiment, the top seal 130 is a double ridged seal with two seal tips 133. In another embodiment, the top seal 130 is a single ridged seal with a single seal tip 133. The top seal 130 can be made of strong, durable but flexible or elastic materials such as silicone or rubber.

The filtration basket 124 additionally comprises a bottom or second seal 146 installed on the side wall 138 for coupling the plunger 118 with the container insert 148. The bottom seal or bottom band 146 may be in the form of a circular banded protrusion having a base or peripheral portion 147 and a seal tip or protrusion 149. The base portion 147 may be installed or positioned in a bottom or second seal compartment 151 formed by the bottom surface 136 and a bottom or second frame 153 extended from the bottom surface 136 to the side wall 138. In the present embodiment, a top portion of the bottom frame 153 is in in contact with a bottom portion of the top frame 137. The bottom seal 146 may be made of strong, durable but flexible or elastic materials such as silicone or rubber.

In the embodiment shown in FIGS. 14-17, the top and bottom seal compartments 135, 151 cover substantially the entire side wall 138. In addition, the top and bottom base portions 131, 147 and frames 137, 153 cover substantially the entire side wall 138. In the embodiment as shown, the base portion 147 expands more than a half of the depth of the basket 124 and covers more than half of the side wall 138 to provide a firm position and not to be misplaced (for example, peeled off) when the plunger 118 is pushed down into the container insert 148 or pulled up with the container insert 148.

The bottom seal 146 can be a single ridged seal which fits snugly with the interior walls of the container insert 148 when the plunger 118 is pushed down, but which will hold enough tension against the interior walls of the insert 148 to temporarily couple with the insert (i.e. provide enough friction) to allow the insert 148 and plunger 118 to be easily pulled up together while holding the infusible material between the third surface of the plunger 136 and the bottom interior surface of the insert 148.

The bottom seal 146 can be made of strong, durable but flexible or elastic materials such as silicone or rubber.

Other alternative coupling means are contemplated by the invention including the use of magnets, clips, latch, corresponding overlapping rubber or silicone seals or rings, and other equivalent temporary coupling means known in the industry. Such coupling means should be easily detachable when the plunger 118, insert 148 and infusible material have been pulled out of the container 112 allowing the infusible material to be easily accessed and discarded.

In an alternative embodiment, the filtration basket 124 is in the shape of a conical frustum, wherein the side wall 138 may slant inward to join a wider top surface 132 with a relatively narrower bottom surface 136. In alternative embodiments, the infusing container 112 and mating plunger 118 with filtration basket 124 with first surface 132 thereof may optionally have another cross-sectional shape, such as a square or rectangular of other shape for example. Further, in alternative embodiments, the bottom surface 136 of the filtration basket 124 may optionally have another shape, such as a rectangular prism or conical frustum, for example. In an alternative embodiment, the plunger 118 having filtration basket 124 may be provided independently, adapted to fit inside an existing infusing container design, for use as an extraction apparatus.

In another alternative embodiments, the filter 124 is built without side wall. In one embodiment, the filter 124 has a top perforated surface 132 and a removable bottom perforated surface 136. In one embodiment, the filter 124 has a top perforated surface 132 and a bottom perforated surface 136, wherein the top perforated surface 132 and the bottom perforated surface 136 are connected by rods only and have no walls in between. Yet in another embodiment, the filter 124 has a top perforated surface 132 and a bottom perforated surface 136, wherein a paper filter can be inserted between the top perforated surface 132 and the bottom perforated surface 136.

The plunger 118 and components thereof may be made from any suitable material such as one or more of polymer, composite, metal, ceramic or other suitable materials, for example.

Figure 18:
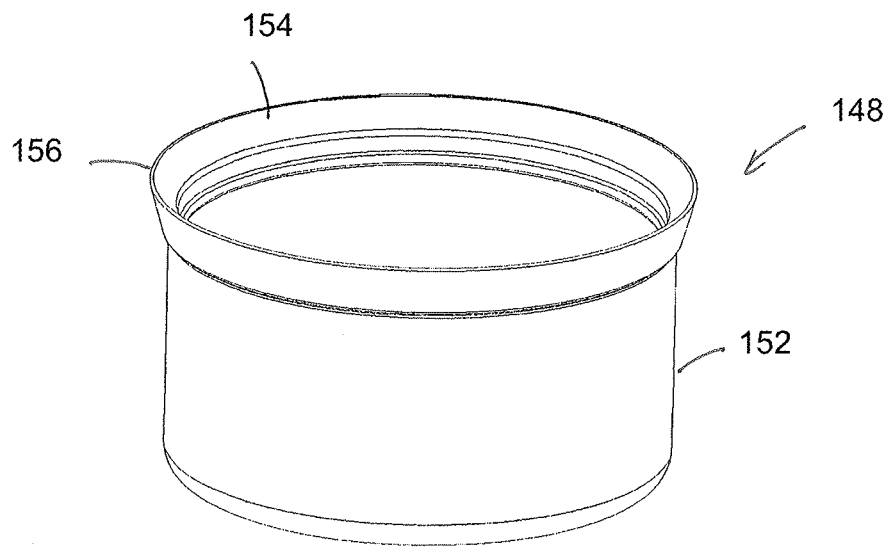
FIG. 18 is a perspective view of another exemplary embodiment of a container insert consistent with the principles of the present disclosure.
Figure 19:
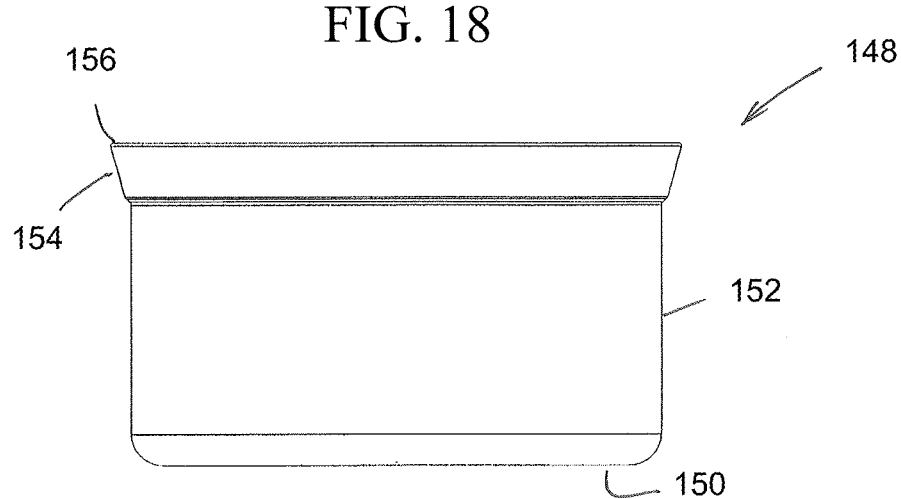
FIG. 19 is a front view of the container insert shown in FIG. 18.
Figure 20:
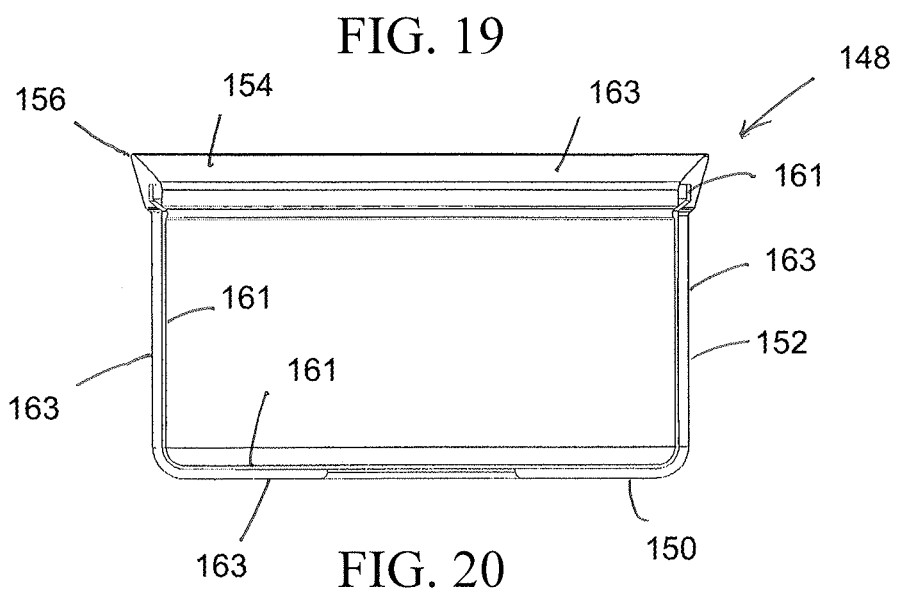
FIG. 20 is a cross-sectional view taken along a plane encompassing a central vertical axis of the container insert and is also parallel to the paper of FIG. 19.
Figure 21:
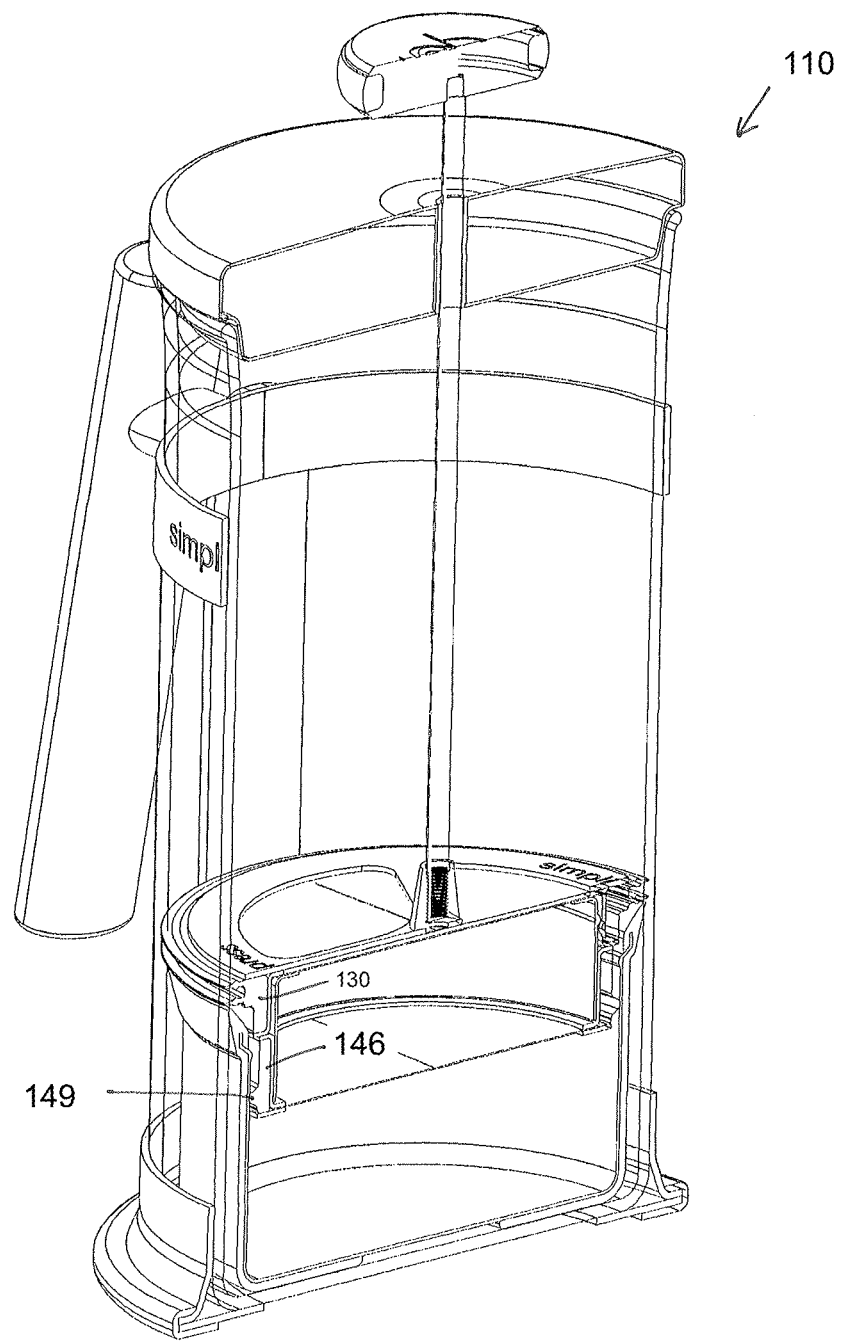
FIG. 21 is a cross-sectional perspective view of FIG. 11 shown the engagement between the plunger and the container insert.

FIG. 18 is a perspective view of another exemplary embodiment of the container insert 148 consistent with the principles of the present disclosure. FIG. 19 is a front view of the container insert 148 shown in FIG. 18. FIG. 20 is a cross-sectional view of FIG. 19. The container insert 148 is adapted to be inserted into the filtration container 112 and pushed down along the filtration container 112 vertical access and seated between the bottom of the filtration container 112 such that a portion of the bottom surface of the container insert 148 is seated against the bottom of the filtration container 112.

The container insert 148 is substantially circular in cross-section and adapted to fit inside the cylindrical infusing container 112. The container insert 148 can be a substantially open container design having bottom 150, side wall 152, and rim 154 having interior and exterior surface.

The container insert 148 can be formed by a rigid element 161 covering substantially all interior surface of the container insert 148 and an elastic (or flexible) element 163 covering the exterior surface and the rim 154. The elastic element 163 can be overmolded over the rigid element 161 to form an integral insert 148. The rigid element 161 may be made of any strong, light and moldable material used in the manufacture of press type extract apparatus such as one or more of polymer, composite, metal, ceramic or other suitable materials, for example. The elastic element 163 may be made of any strong, light and moldable material used in the manufacture of press type extract apparatus such as one or more of polymer, composite, silicon, silicon rubber, ceramic or other suitable materials, for example.

The rim 154 can be beveled (or sloped) inward to allow the infusible material to more easily move down into the insert when the plunging 118 is pushed into the container.

The rim 154 can have peripheral sealing means 156. The sealing means 156 is situated around the substantially circular outside edge of the insert rim 154 to provide a seal against the cylindrical wall of the infusing container 112 when the insert 112 is moved inside the infusing container 112 and is seated at the bottom of the infusing container 112 to substantially prevent infusible material from leaking around the sealing means 156 when the extract and infusible material are pushed downward along the vertical axis of the infusion container 112 during use.

In alternative embodiments, the infusing container 112 and mating container insert 148 may optionally have another cross-sectional shape, such as a square or rectangular or other shape for example, wherein the sealing means 156 may be situated around the edge or edges of the insert rim 152. Further, in alternative embodiments, the container insert 148 may be provided independently, adapted to fit inside an existing infusing container design. In such an embodiment, the plunger 118 with filtration basket 124 as well as the mating container insert 148 may be adapted for retrofittable use with one or more existing infusing containers, such as one or more standard or commonly available infusing containers from existing French press extraction apparati, as are known in the art.

In one embodiment, the container insert 148 has a ring of protrusion or bump located on the interior surface to provide a mating to facilitate the engagement with the bottom seal 146 of the filtration basket 124. While the corresponding coupling means is elastic enough to allow coupling, they prevent the plunging 118 from de-coupling with the container insert 148 when the plunging 118 and container insert 148 are pulled out of the infusing container 112.

The top seal 130 and bottom seal 146 and the container insert sealing means 156 may comprise any suitable known seal material and/or design. Such sealing means designs may include single or multiple lip seals, single or multiple wiper seals, single or double ridged seals, and single or multiple U-cup seal designs, for example. Suitable such single or multiple U-cup seal designs may desirably be self-energizing, such that an outer edge of the U-cup seal actively engages and seals with the inner wall of the infusing container 112 or insert 148 while allowing the plunger to be pushed down into the container 112. Exemplary suitable seal materials may comprise one or more of: silicone, polymers (such as polyurethane for example) and silicone or polymer materials impregnated with carbon or other additives. Additionally, sealing means (130, 146 and 156) may comprise one or more such suitable seal materials by themselves, or alternatively, such seal materials may surround or be overmolded over a support material, such as a metal or composite support material, for example. The above described exemplary sealing means materials and designs may also apply to sealing means incorporated in other embodiments of the invention, such as those described herein.

As shown in the example embodiment of FIGS. 11-18 and described above, the filtration basket 124 has bottom seal 146 configured to engage with the inside walls of the container insert 148. The bottom seal 146 presses against the interior surface of the insert 148 as it moves downward and fits snugly enough to allow the plunger 118 and insert 148 to be pulled up together without decoupling. Such arrangement is beneficial in insuring a greater compression of the infusible material at the bottom of the insert. The purpose of the bottom seal 146 is to provide a temporary engagement between the plunging 118 and the container insert 148 when the plunging 118 is pushed down into the infusion container 112 containing the container insert 148 and the infusible material has been trapped at the bottom between the second surface 136 of the plunger 118. The coupling of the filtration basket and the insert allows the plunging 118 and container insert 148 to be pulled up together holding the infusible material, substantially removing the infusible material from the filtration container 112.

Figure 22:
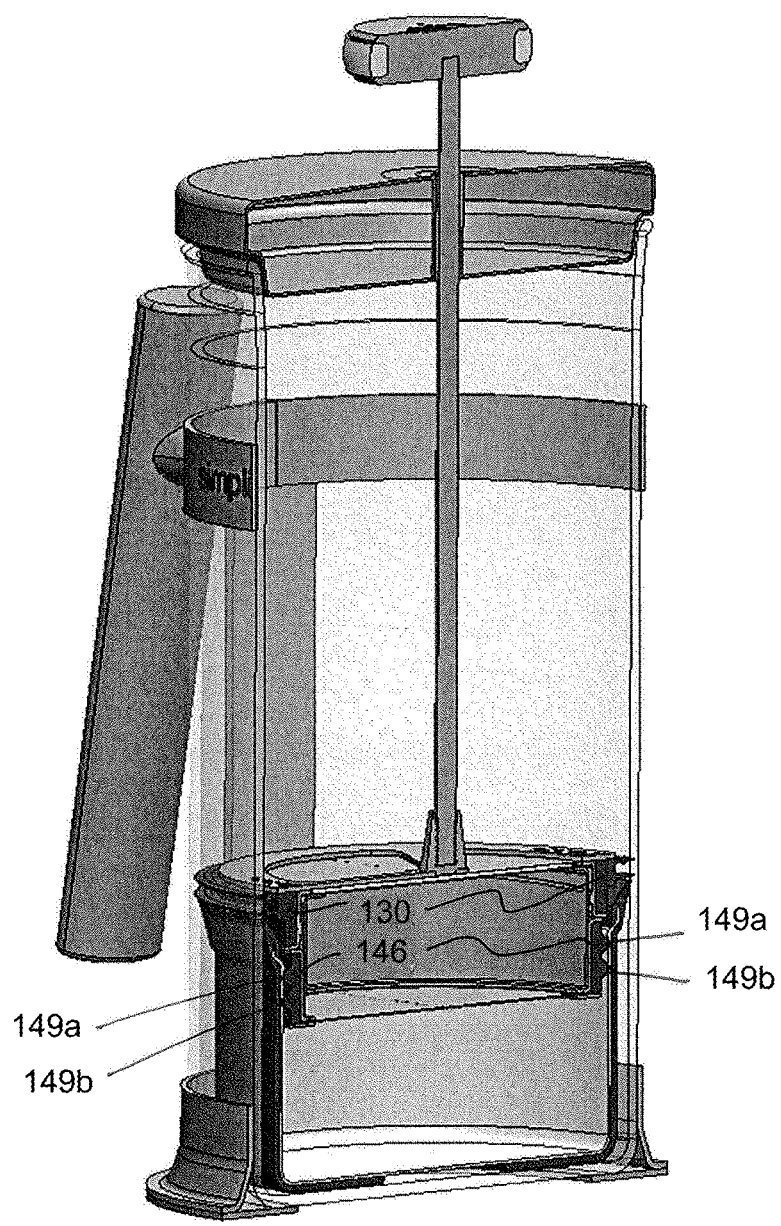
FIG. 22 is a cross-sectional perspective view showing another embodiment of the plunger.

In the example shown a single bottom seal tip or protrusion 149 is utilized (see FIGS. 13-17 and 21). In alternative embodiments, more than one bottom seal tips may be utilized. In the embodiment as shown in FIG. 22, which is a cross-sectional perspective view showing the engagement between the plunging and the container insert, two bottom seal tips 149a, 149b shown as two circular protrusions sharing a single base portion 147 are provided.

Figure 23:
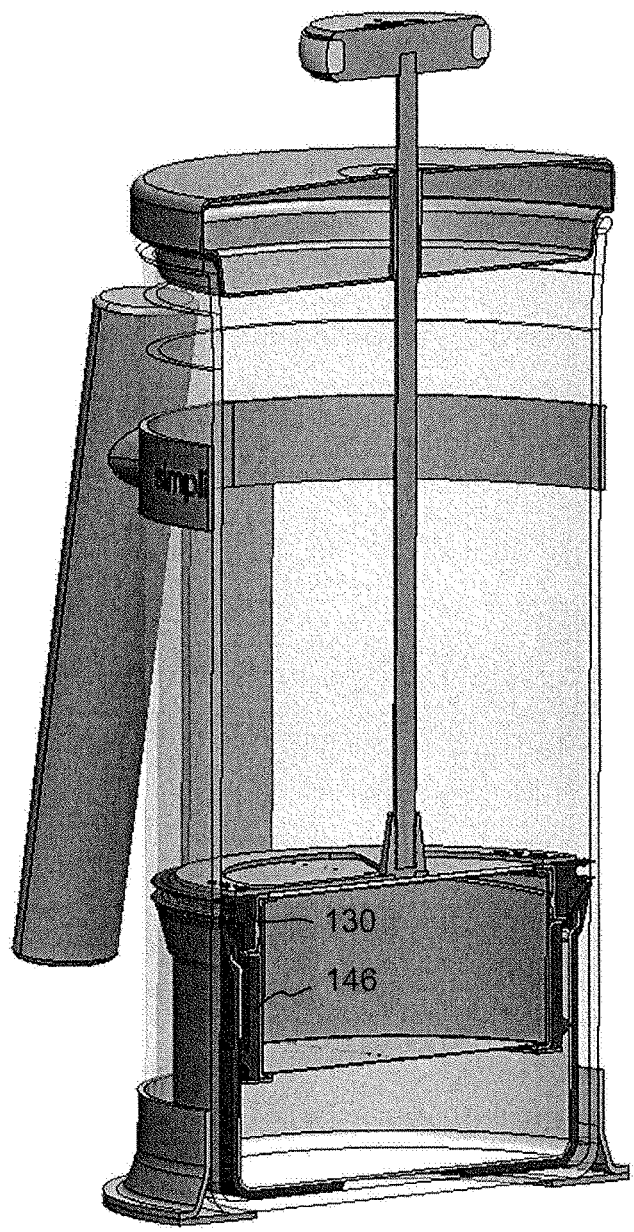
FIG. 23 is a cross-sectional perspective view showing another embodiment of the plunger.

FIG. 23 is a cross-sectional perspective view illustrating another embodiment of the plunger. In FIG. 23, the dimension of the filtration chamber 140 is larger than that in FIGS. 11-22.

Figure 24A:
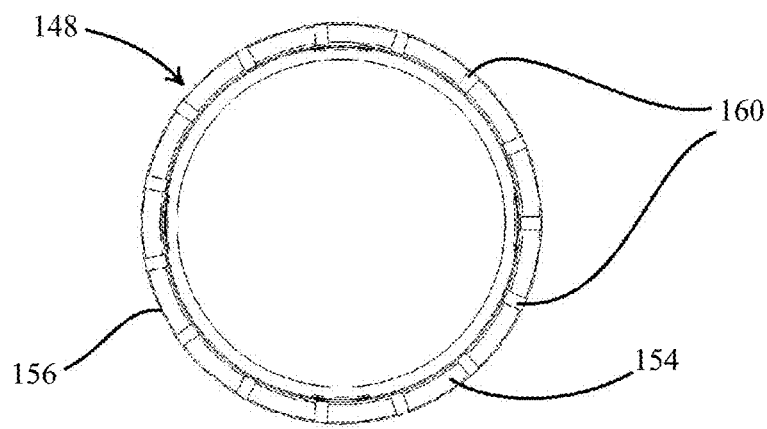
FIG. 24A is a top view of a container insert incorporating physical structures to disrupt the seal between the container insert and the container.
Figure 24B:
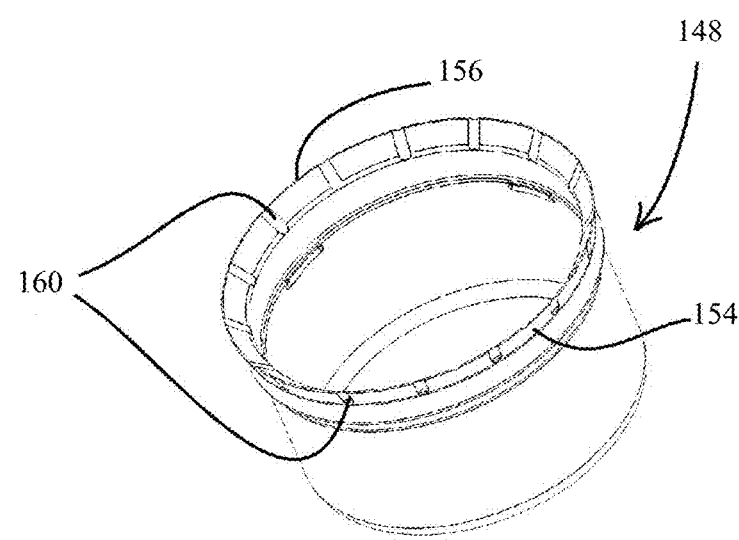
FIGS. 24B and 24C are a perspective view and a side cutaway view of the container insert of FIG. 24A.
Figure 24C:
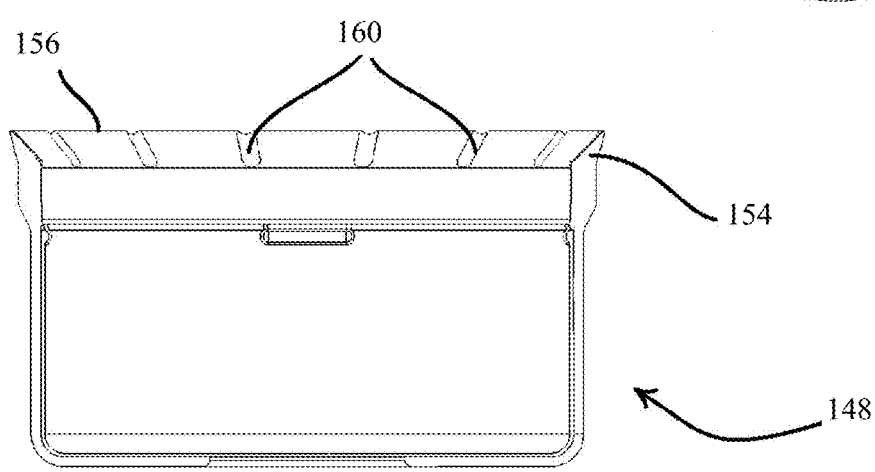

In alternative embodiments, as shown in FIGS. 24A-24C, the rim 154 may be beveled or sloped inward to guide or direct the infusible material 16 into the container insert 148 when the plunger 118 presses the filtration basket 124 down into the container insert 148. As explained in relation to FIGS. 14-17, once the filtration basket 124 is pressed down into the container insert 148, the bottom seal 146 may temporarily couple with an interior annular ridge or edge in the container insert 148. When the plunger is lifted, the container insert 148 lifts out of container 112 with filtration basket 124.

When the container insert 148 is lifted, the sealing means 156 may flex or bend over itself, pressing the bent sealing means tightly against container 112, and possibly forming an air-tight or air-resistant seal between the edges of the container insert 148 and the interior of the container 112. As the container insert 148 is lifted from container 112, the semi-sealed volume beneath container insert 148 increases, thereby creating a low pressure chamber, resistant to the upward motion of the container insert 148. The downward force from the low pressure chamber may break the temporarily coupling formed between the bottom seal 146 of the filtration basket 124 and the container insert 148.

To counter-act these effects from the pressure differential, seal disruptors 160 may be formed in or on the rim 154 of sealing means 156 to allow air or liquid to pass between the sealing means 156 and the wall of the infusing container 112 when the rim 154 is bent over due to upward pressure from the plunger 118. These physical structures 160 may include indents, as depicted in FIGS. 24A-24C, or any other physical structure 160 that creates air or liquid passages around the rim 154 may be incorporated. Some other examples of potential seal-disrupting physical structures 160 include perforations or slits, channels or tunnels, elevated bumps or ridges, or even scalloped or variable height/thickness of the rim 154. These physical structures 160 may be located on the interior, on the exterior, or both on the interior and exterior of the rim 154. In some embodiments the physical structures 160 are located at the tip of the rim 154, while in other embodiments, the physical structures 160 are disposed lower on the rim 154. Any of these embodiments functions by creating pathways for air or fluid to pass between the container 112 and the container insert 148, reducing the pressure difference above and below the container insert 148 and therefore reducing the resistance to the temporary coupling between the filtration basket 124 and the container insert 148.

In alternative embodiments (not shown), the bottom 150 of container insert 148 may include perforations or filtrations to counter-act the negative effects of pressure imbalance. The perforations or filtrations enable air or liquid to flow between the container insert 148 and the container 112, while capturing the materials contained in the container insert 148. The bottom filtration makes it easier for a user to lift or remove the container insert 148 from the container 112 without having to empty the infusing container 112 of the infused liquid.

Examples of alternative seals may include other fasteners such as hook and loop (Velcro), magnets, clips, latch, suction cups or even threaded (i.e. screw in) type means which would allow the filtration basket to engage with the insert and be pulled up through the container and subsequently disengaged without difficulty. As can be appreciated by skilled artisans, the components disclosed herein may be made of different materials or have different designs, all of which are included within the spirit and scope of the claims, including U.S. Pat. Nos. 8,770,097 and 9,408,490 and US Patent Publication Nos. 2017-0027372 and 2017-0071396, all of which are incorporated herein by reference in their entirety.

The present disclosure has now been described with reference to several embodiments thereof. The entire disclosure of any patent or patent application identified herein is hereby incorporated by reference. The foregoing detailed description and examples have been provided for clarity of understanding only. No unnecessary limitations are to be understood therefrom. It will be apparent to those skilled in the art that many changes can be made in the embodiments described without departing from the scope of the disclosure. Further, the steps used to describe the method for making the various exemplary embodiments may be performed in different order and the number of steps may differ depending on the complexity (i.e., number of elements) associated with each exemplary apparatus. Thus, the scope of the present disclosure should not be limited to the assemblies described herein, but only by the assemblies and methods described by the language of the claims and their equivalents.

What is claimed is:

1. An apparatus for separating an infused extract from a mixture of an infusible material and the extract, the apparatus comprising:
   a container configured to hold the mixture, the container having an opening, a bottom, a vertical axis and centerline that extends between the opening and the bottom, and one or more inner walls;
   an insert adapted to be inserted into the container through the opening and removably seated at the bottom thereof; and
   an elongated plunger comprising a filtration basket, the filtration basket comprising:
      a first outer portion comprising:
         a top perforated surface opposing one or more meshed surfaces;
         a first frame forming a first compartment, the first frame coupled to the top perforated surface and the one or more meshed surfaces; and
         a unitary first flexible band comprising at least one first sealing tip and a first peripheral portion, the first sealing tip being configured and dimensioned to fit snugly within the interior walls of the container when the plunger is inserted into the container, the first peripheral portion being at least partially disposed within the first compartment;
      a second outer portion comprising:
         a bottom perforated surface;

a second frame forming a second compartment, the second frame coupled to the bottom perforated surface; and a unitary second flexible band comprising at least one first protrusion and a second peripheral portion, the first protrusion being configured and dimensioned to fit snugly in the interior walls of the insert when the plunger is moved down into the insert, the second peripheral portion at least partially disposed within the second compartment; and the first outer portion is configured to removably engage with the second outer portion, the filtration basket is configured to separate the infusible material from the infused extract as the plunger is moved down along the vertical axis toward the bottom of the container, the filtration basket having a side wall positioned between the top perforated surface of the first outer portion and the bottom perforated surface of the second outer portion.

2. The apparatus of claim 1, wherein the second outer portion is shorter than the side wall of the filtration basket in a direction parallel to the vertical axis of the container.

3. An apparatus for separating an infused extract from a mixture of an infusible material and the extract, the apparatus comprising:

a container configured to hold the mixture, the container having an opening, a bottom, a vertical axis and centerline that extends between the opening and the bottom, and one or more inner walls;

an elongated plunger that interfits with the container to define and separate a lower chamber and an upper chamber, the plunger comprising:
   a first outer portion comprising:
      a top perforated surface;
      a first frame forming a first compartment; and
      a first band comprising at least one first sealing tip and a first peripheral portion, the first peripheral portion being at least partially disposed within the first compartment; and a filtration basket coupled to the first outer portion and adapted to separate the infusible material from the infused extract as the plunger is moved down along the vertical axis toward the bottom of the container, the filtration basket having a second band comprising at least one first protrusion, a bottom perforated surface and a non-perforated solid side wall, the non-perforated solid side wall positioned between the top perforated surface of the first outer portion and the bottom perforated surface of the filtration basket; and an insert adapted to be inserted into the container through the opening and removably seated at the bottom thereof, wherein the first protrusion of the second band is configured and dimensioned to fit snugly within the interior walls of the insert when the plunger is moved down into the insert, wherein the infused extract in the lower chamber passes through the bottom perforated surface of the filtration basket, then across the top perforated surface of the first outer portion and into the upper chamber, as the plunger is moved down along the vertical axis toward the bottom of the container, and wherein the filtration basket is adapted to hold the infusible material in the lower chamber between the filtration basket and the bottom of the container.

4. The apparatus of claim 3, wherein the second band further comprises a second peripheral portion being at least partially disposed within the filtration basket.

5. The apparatus of claim 4, wherein the first sealing tip is configured and dimensioned to fit snugly within the interior walls of the container when the plunger is inserted into the container.

6. The apparatus of claim 4, wherein the first outer portion and second outer portion enclose the non-perforated solid side wall of the filtration basket.

7. The apparatus of claim 6, wherein the first outer portion is shorter than the non-perforated solid side wall of the filtration basket in a direction parallel to the vertical axis of the container.

8. The apparatus of claim 7, wherein the first outer portion is shorter than the second outer portion in a direction parallel to the vertical axis of the container.

9. The apparatus of claim 6, wherein the second outer portion is taller than half the height of the non-perforated solid side wall of the filtration basket in a direction parallel to the vertical axis of the container.

10. The apparatus of claim 4, wherein the second band is a unitary flexible band.

11. The apparatus of claim 3, wherein the first band is a unitary flexible band.

12. The apparatus of claim 3, wherein the first band further comprises a second sealing tip, and the first and second sealing tips fit snugly within the interior walls of the container when the plunger is inserted into the container.

13. The apparatus of claim 3, wherein the insert comprises a ridge on the inside of the insert and the first protrusion is configured to engage the ridge.

14. The apparatus of claim 3, further comprising a frame structure provided around the container to protect the container from damage, the frame structure having a partial ring element disposed around the perimeter of the container, one or more vertical elements coupled to the partial ring element, and a base in which the container sits.

15. The apparatus of claim 3, wherein the bottom perforated surface has a plurality of first perforations and the top perforated surface has a plurality of second perforations, the plurality of second perforations are larger in size than the plurality of first perforations and are adapted to increase the flow of infused extract from the lower chamber to the upper chamber.

16. An apparatus for separating an infused extract from a mixture of an infusible material and the extract, the apparatus comprising:

a container configured to hold the mixture, the container having an opening, a bottom, a vertical axis and centerline that extends between the opening and the bottom, and one or more inner walls;

an insert adapted to be inserted into the container through the opening and removably seated at the bottom thereof; and an elongated plunger comprising a filtration basket, the filtration basket comprising:
   a first outer portion comprising:
      a top perforated surface opposing a bottom perforated surface;
      a first frame forming a first compartment; and
      a first band comprising at least one first sealing tip and a first peripheral portion, the first peripheral portion being at least partially disposed within the first compartment;
   a second outer portion comprising:
      a bottom perforated surface;

a second frame forming a second compartment; and a second band comprising at least one first protrusion and a second peripheral portion, the first protrusion being configured and dimensioned to fit snugly in the interior walls of the insert when the plunger is moved down into the insert; and the first outer portion is configured to removably engage with the second outer portion, the filtration basket is configured to separate the infusible material from the infused extract as the plunger is moved down along the vertical axis toward the bottom of the container, the filtration basket having a side wall positioned between the top perforated surface of the first outer portion and the bottom perforated surface of the second outer portion.

17. The apparatus of claim 16, wherein the first outer portion and second outer portion enclose the side wall of the filtration basket.

18. The apparatus of claim 17, wherein the insert comprises a ridge on the inside of the insert and the first protrusion is configured to engage the ridge.

19. The apparatus of claim 18, wherein the first band and the second band are constructed of a flexible material.

* * * * *